United States Patent [19]
Gerszberg et al.

[11] Patent Number: 6,044,403
[45] Date of Patent: Mar. 28, 2000

[54] NETWORK SERVER PLATFORM FOR INTERNET, JAVA SERVER AND VIDEO APPLICATION SERVER

[75] Inventors: Irwin Gerszberg, Kendall Park; Kenny Xiaojian Huang, Somerset; Christopher K. Kwabi, Englewood; Jeffrey S. Martin, Dover; Robert Raymond Miller, II, Township of Morris, Morris County; Jesse Eugene Russell, Piscataway, all of N.J.

[73] Assignee: AT&T Corp, New York, N.Y.

[21] Appl. No.: 09/001,354

[22] Filed: Dec. 31, 1997

[51] Int. Cl.[7] ...................................................... G06F 13/00
[52] U.S. Cl. ........................... 709/225; 709/217; 709/223; 709/238
[58] Field of Search ...................................... 709/201, 202, 709/203, 217, 219, 223, 224, 225, 227, 229, 238, 300, 250

[56] References Cited

U.S. PATENT DOCUMENTS

| | | |
|---|---|---|
| 4,456,925 | 6/1984 | Skerlos et al. . |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,157,717 | 10/1992 | Hitchcock . |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,965 | 12/1996 | Douma et al. . |
| 5,584,054 | 12/1996 | Tyneski et al. . |
| 5,587,735 | 12/1996 | Ishida et al. . |
| 5,610,910 | 3/1997 | Focsaneanu et al. ..................... 370/351 |
| 5,619,684 | 4/1997 | Goodwin et al. . |
| 5,644,628 | 7/1997 | Schwarzer et al. . |
| 5,671,267 | 9/1997 | August et al. . |
| 5,682,195 | 10/1997 | Hendricks et al. . |
| 5,684,918 | 11/1997 | Abecassis . |
| 5,740,231 | 4/1998 | Cohn et al. ........................... 379/88.22 |
| 5,761,662 | 6/1998 | Dasan .......................................... 707/10 |
| 5,796,952 | 8/1998 | Davis et al. ............................. 709/224 |
| 5,850,433 | 12/1998 | Rondeau ................................. 379/201 |
| 5,867,495 | 2/1999 | Elliott et al. ............................ 370/352 |
| 5,878,130 | 3/1999 | Andrews et al. ........................ 379/265 |
| 5,889,958 | 3/1999 | Willens .................................... 709/229 |
| 5,892,909 | 4/1999 | Grasso et al. ........................... 709/201 |
| 5,893,091 | 4/1999 | Hunt et al. .................................. 707/3 |

OTHER PUBLICATIONS

US Patent Application 08/943,312 filed Oct. 14, 1997, entitled Wideband Communication System for the Home, to Robert R. Miller, II and Jesse E. Russell, 21 pages.

US Patent Application 08/858,170 filed May 14, 1997, entitled Wide Band Transmission Through Wire, to Robert R. Miller, II, Jesse E. Russell and Richard R. Shively, 15 pages.

*Primary Examiner*—Viet D. Vu

[57] ABSTRACT

A new architecture capable of utilizing the existing twisted pair interface between the customer services equipment and the local office is used to provide a vast array of new services to customers. Using an intelligent services director (ISD) at the customer services equipment and a facilities management platform (FMP) at the local office, new services such as simultaneous, multiple calls (voice analog or digital), facsimile, Internet traffic and other data can be transmitted over the existing single twisted pair using xDSL transmission schemes. New services such as the implementation of Internet connectivity, videophone, utility metering, broadcasting, multicasting, bill viewing, information pushing in response to a user profile, directory look-up and other services can be implemented via a network server platform via this architecture. A network server platform for hosting a plurality of services comprises, for example, a memory for storing a user profile, the user profile containing interests of a user, and for storing information related to their interests and a controller for controlling the collection of information from information servers and for pushing the collected information to the user in accordance with their defined priority.

14 Claims, 21 Drawing Sheets

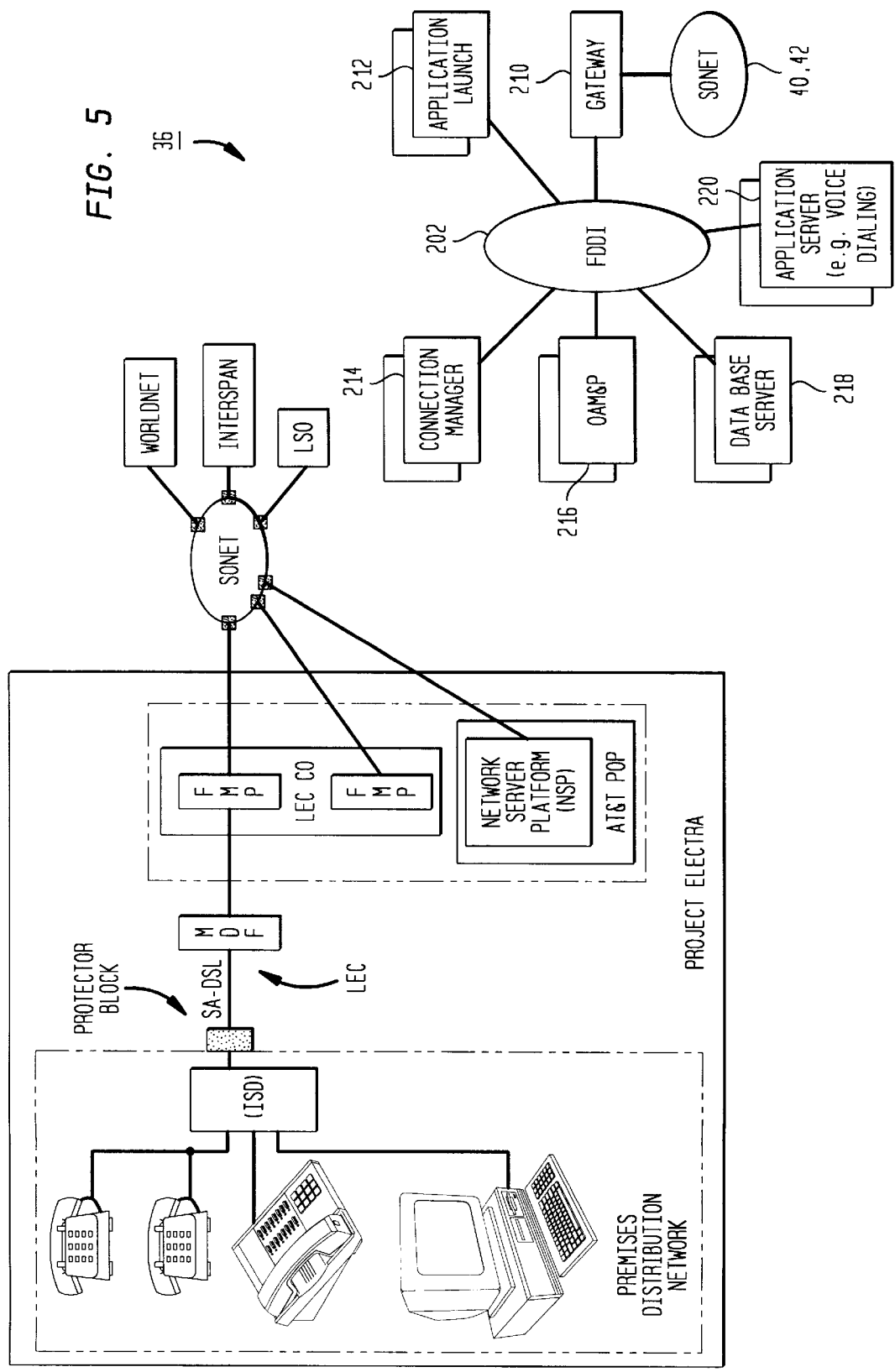

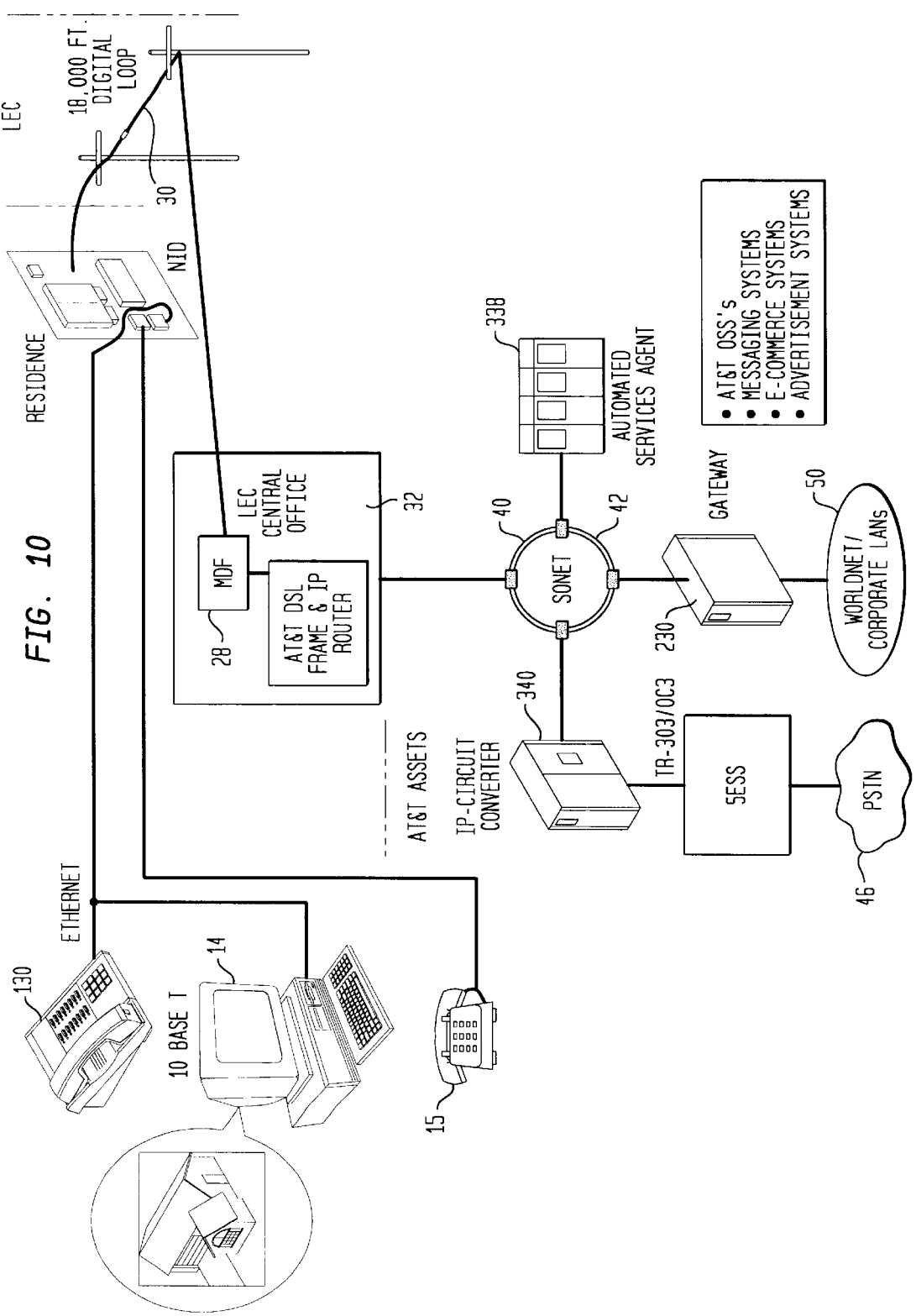

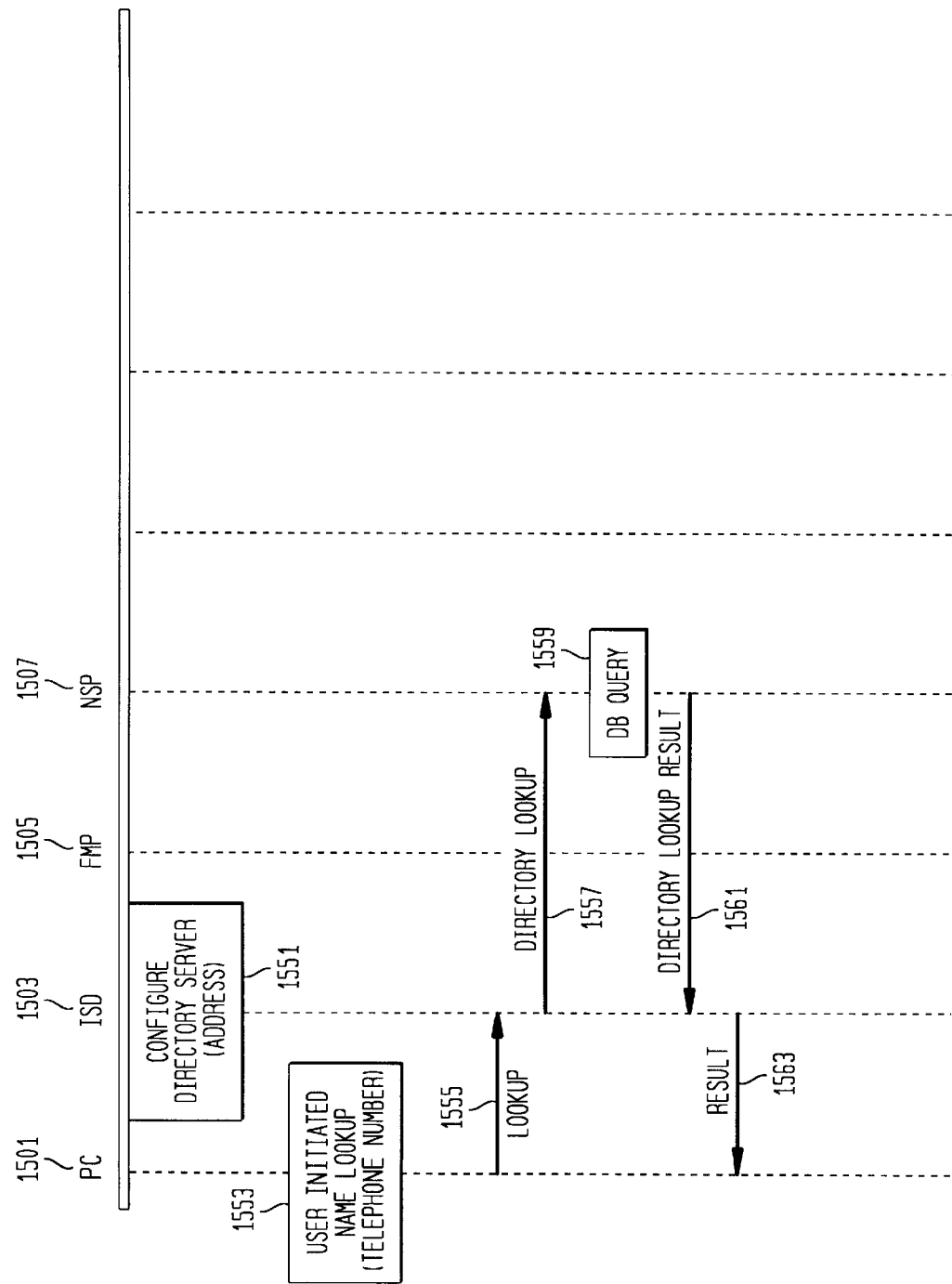

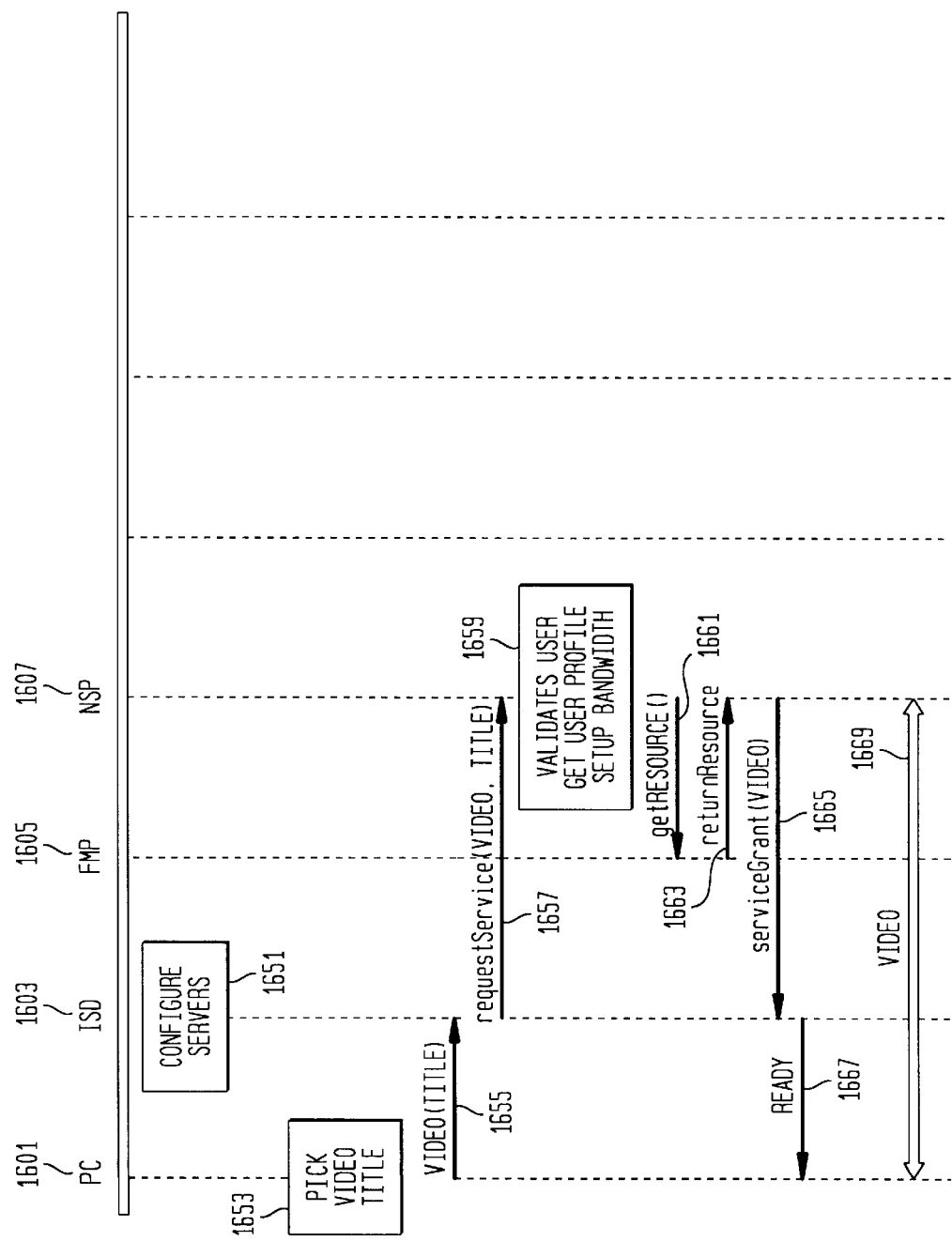

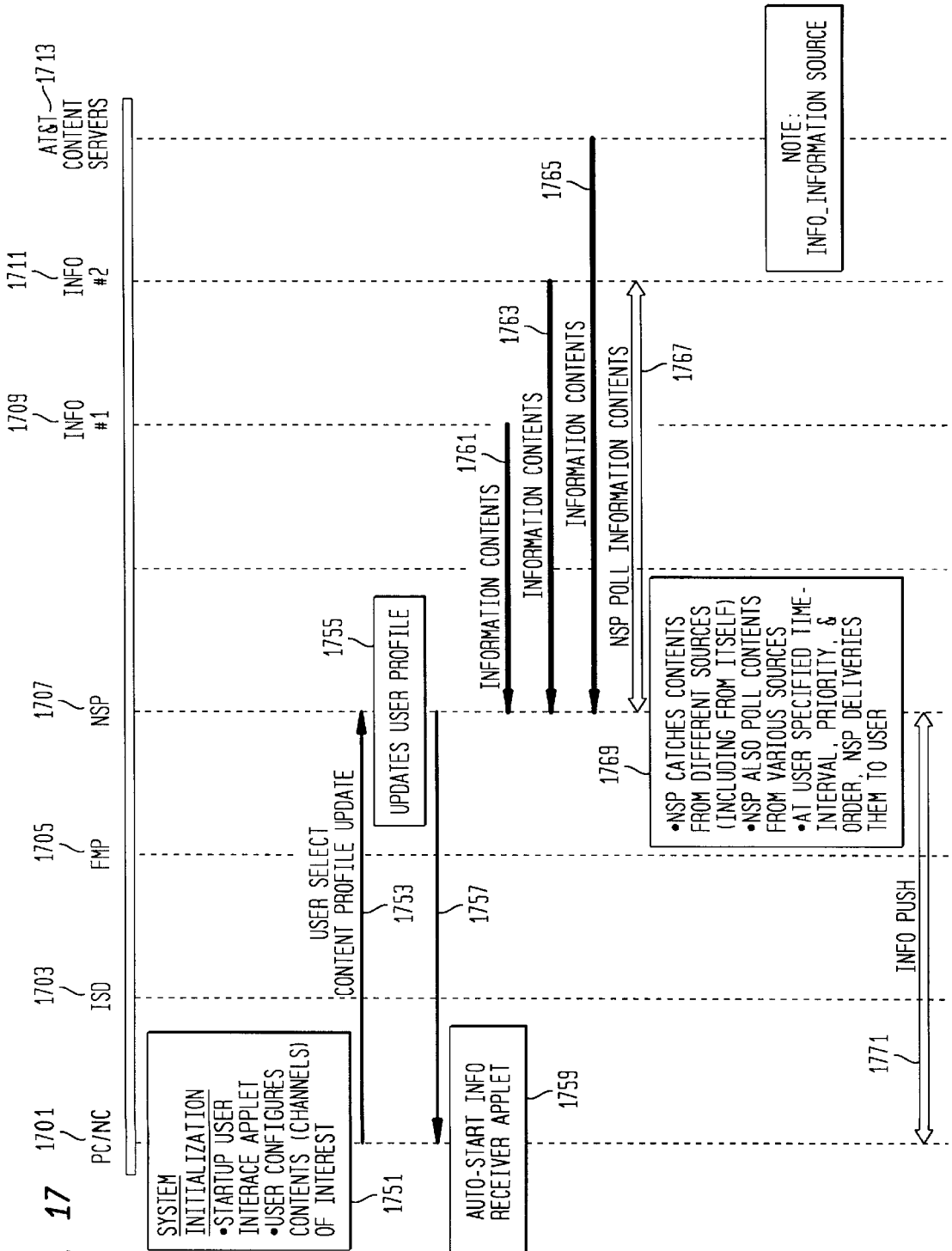

NETWORK SERVER PLATFORM FOR INTERNET, JAVA SERVER AND VIDEO APPLICATION SERVER

FIELD OF THE INVENTION

This invention discloses an architecture for supporting increased bandwidth to customer premises equipment allowing for increased services including videophone, analog and digital voice traffic, facsimile, voice mail, Internet traffic, and automated home services relating to meter reading, security, and energy management and, in particular how a network server platform of the architecture supports Internet connectivity, downloads from a JAVA server and a video application server.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that as the interexchange carriers attempt to penetrate the local telephone company's territory, they must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs and/or desired quality levels. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. Using the existing copper twisted pair infrastructure limits the number of users on the twisted pair and the bandwidth transmitted. Expanding the number of simultaneous users and the bandwidth without replacing the existing twisted pair infrastructure is desired. By increasing the bandwidth and the number of simultaneous services transmitted over a single twisted pair will allow service providers an opportunity to expand and enhance services into consumers' homes and business operations while minimizing the incremental costs associated with initiating enhanced, new services.

In the process of providing enhanced, new services, it is desired for the service provider to offer fault tolerant, transparent interfaces for the user. Because of the need to keep costs minimized, flexibility for using existing hardware and software systems is important. Therefore, it is also desired that the fault tolerant services offered be flexible to interface across multiple lines of hardware and various versions of software.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

The overall architecture of the system includes a hybrid optical fiber/twisted pair infrastructure functionally coupling the customer premises equipment to the facilities management platform by twisted pair operating xDSL technology. The utilization of xDSL technology increases the bandwidth to the customer premises equipment and allows for the offering of simultaneous services along the same twisted pair.

The facilities management platform is functionally coupled to a communication network and is supported by a network server platform. Typically, the facilities management platform is located at the local office, while the network server platform is located in a separate location due to space limitations at the local office. The architecture provides variable bandwidth channels, depending on the service requested by the subscriber, and may be dynamically adapted for providing requested services in both directions of transmission. Voice and data are intelligently multiplexed in order to maximize the available bandwidth of the twisted pair.

The facilities management platform supports both fiber and wire connections into the local telephone company's communication network, cable television network, Internet service provider's network or into a wireless communication's network.

The network server platform may provide various functionality to each of the connected ISD's for such things as downloading of cooking recipes, bill paying, meter reading and the like for any connected device and dedicated applications for specific devices such as bill viewing from a video phone. The network server platform hosts the plurality of services and comprises, for example, a memory for storing a user profile, the user profile containing interests of a user, and for storing information related to their interests and a controller for controlling the collection of information from information servers and for pushing the collected information to the user in accordance with their defined priority.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 5 illustrates a block diagram of the FDDI interface located within the NSP.

FIG. 9A shows from the time a user logs on to their personal computer (PC) or network computer (NC) to the time a menu list of accessible services is displayed on their computer display; FIG. 9B shows service processing from the time the user selects an available service to the time either service is allowed or denied.

FIG. 10 illustrates the overall architecture and layout of the equipment to implement new services.

FIG. 13 is a service process flow diagram for showing how the NSP in concert with an ISD provides a telecommuting service via, for example, an employer's office server using a frame relay backbone to interconnect the office server and a home terminal and FIG. 14 shows a similar service process flow diagram for using the Internet to interconnect an office server and a home terminal.

FIG. 15 is a service process flow diagram for showing how the NSP in concert with an ISD at a user's home and via an FM? serving that user provides white and yellow pages directory services including home shopping and dialing services.

FIG. 16 is a service process flow diagram for showing how the NSP in concert with an ISD at a user's home and via an FMP serving that user provides multicast audio and/or video program services or software, game and other program or information delivery services.

FIG. 17 is a service process flow diagram for showing how the NSP may comprise cache memory and maintain a user profile such that the NSP may obtain information from various information service providers for forwarding and display to a user in accordance with their user profile.

DETAILED DESCRIPTION OF PREFERRED EMBODIMENTS

Figure 1:
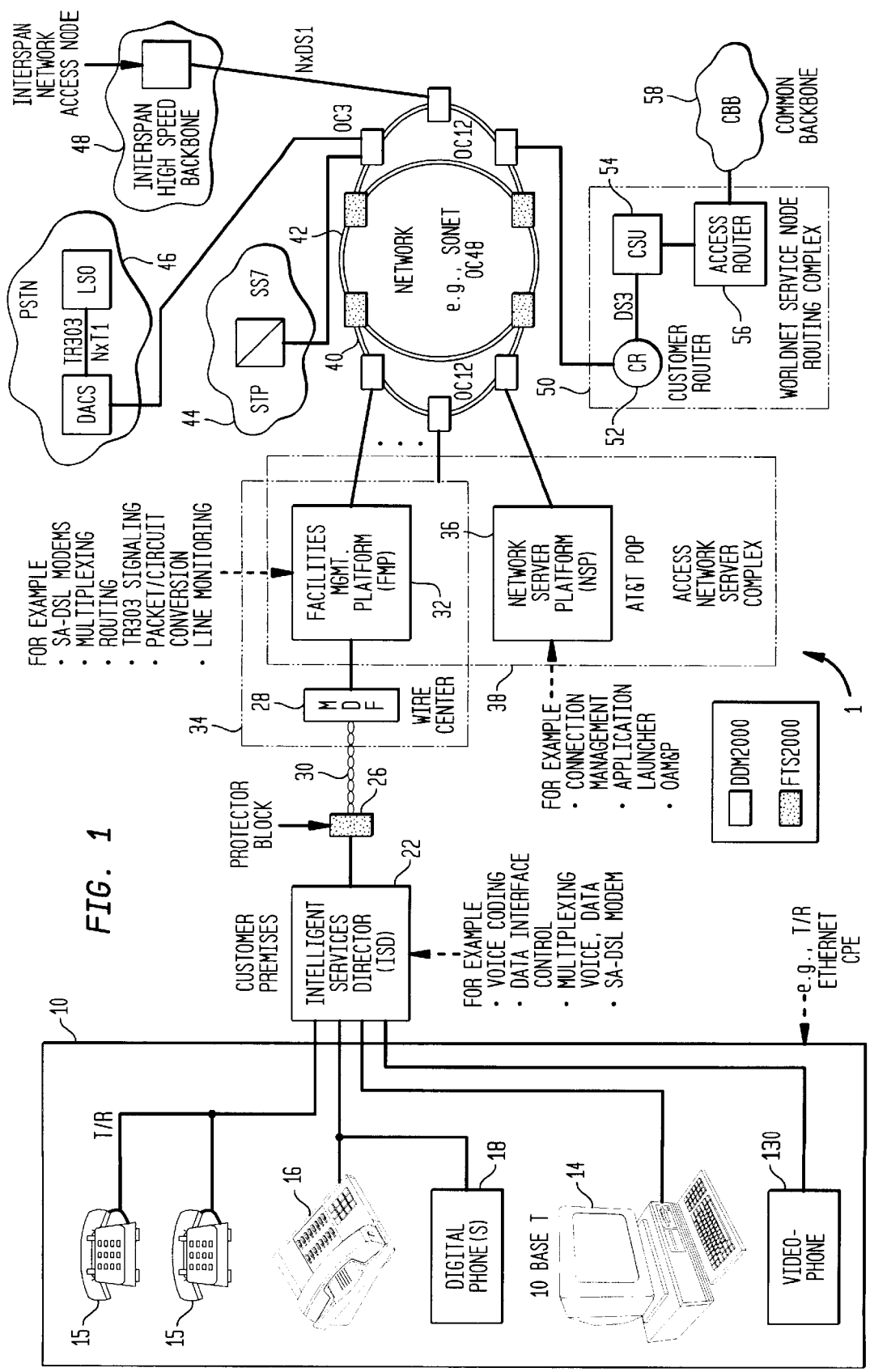
FIG. 1 illustrates an embodiment of a hybrid fiber twisted pair local loop architecture.

The following applications, filed concurrently herewith, are hereby incorporated by reference:

1. A Hybrid Fiber Twisted-pair Local Loop Network Service Architecture U.S. application Ser. No. 09/001,360, filed Dec. 31, 1997;
2. Dynamic Bandwidth Allocation for use in the Hybrid Fiber Twisted-pair Local Loop Network Service Architecture) U.S. application Ser. No. 09/001,425, filed Dec. 31, 1997;
3. The VideoPhone U.S. application Ser. No. 09/001,905, filed Dec. 31, 1997;
4. VideoPhone Privacy Activator U.S. application Ser. No. 09/001,909, filed Dec. 31, 1997;
5. VideoPhone Form Factor U.S. application Ser. No. 09/001,583, filed Dec. 31, 1997;
6. VideoPhone Centrally Controlled User Interface With User Selectable Options U.S. application Ser. No. 09/001,576, filed Dec. 31, 1997;
7. VideoPhone User Interface Having Multiple Menu Hierarchies U.S. application Ser. No. 09/001,908, filed Dec. 31, 1997;
8. VideoPhone Blocker U.S. application Ser. No. 09/001,353, filed Dec. 31, 1997;
9. VideoPhone Inter-com For Extension Phones U.S. application Ser. No. 09/001,358, filed Dec. 31, 1997;
10. Advertising Screen Saver U.S. application Ser. No. 09/001,574, filed Dec. 31, 1997;
11. VideoPhone FlexiView Advertising Information Display for a Visual Communication Device U.S. application Ser. No. 09/001,906, filed Dec. 31, 1997;
12. VideoPhone Multimedia Announcement Answering Machine U.S. application Ser. No. 09/001,911, filed Dec. 31, 1997;
13. VideoPhone Multimedia Announcement Message Toolkit U.S. application Ser. No. 09/001,345, filed Dec. 31, 1997;
14. VideoPhone Multimedia Video Message Reception U.S. application Ser. No. 09/001,362, filed Dec. 31, 1997;

15. VideoPhone Multimedia Interactive Corporate Menu Answering Machine Announcement U.S. application Ser. No. 09/001,574, filed Dec. 31, 1997;
16. VideoPhone Multimedia Interactive On-Hold Information Menus U.S. application Ser. No. 09/001,356, filed Dec. 31, 1997;
17. VideoPhone Advertisement When Calling Video Non-enabled VideoPhone Users U.S. application Ser. No. 09/001,361, filed Dec. 31, 1997;
18. Motion Detection Advertising U.S. application Ser. No. 09/001,355, filed Dec. 31, 1997;
19. Interactive Commercials U.S. application Ser. No. 09/001,578, filed Dec. 31, 1997;
20. VideoPhone Electronic Catalogue Service U.S. application Ser. No. 09/001,421, filed Dec. 31, 1997;
21. A Multifunction Interface Facility Connecting Wideband Multiple Access Subscriber Loops With Various Networks (U.S. application Ser. No. 09/001,422, filed Dec. 31, 1997);
22.
23. Life Line Support for Multiple Service Access on Single Twisted-pair U.S. application Ser. No. 09/001,343, filed Dec. 31, 1997;
24. A Network Server Platform (NSP) For a Hybrid Fiber Twisted-pair (HFTP) Local Loop Network Service Architecture U.S. application Ser. No. 09/001,582, filed Dec. 31, 1997;
25. A Communication Server Apparatus For Interactive Commercial Service U.S. application Ser. No. 09/001,344, filed Dec. 31, 1997;
26. NSP Multicast, PPV Server NSP Based Multicast Digital Program Delivery Services (U.S. application Ser. No. 09/001,580, filed Dec. 31, 1997);
27. NSP Internet, JAVA Server and VideoPhone Application Server U.S. application Ser. No. 09/001,354, filed Dec. 31, 1997;
28. NSP WAN Interconnectivity Services for Corporate Telecommuters Telecommuting (U.S. application Ser. No. 09/001,540, filed Dec. 31, 1997);
29. NSP Telephone Directory White-Yellow Page Services U.S. application Ser. No. 09/001,426, filed Dec. 31, 1997;
30. NSP Integrated Billing System For NSP services and Telephone services U.S. application Ser. No. 09/001,359, filed Dec. 31, 1997;
31. Network Server Platform/Facility Management Platform Caching Server U.S. application Ser. No. 09/001,419, filed Dec. 31, 1997;
32. An Integrated Services Director (ISD) Overall Architecture (U.S. application Ser. No. 09/001,417, filed Dec. 31, 1997);
33. ISD/VideoPhone (Customer Premises) Local House Network (U.S. application Ser. No. 09/001,418, filed Dec. 31, 1997);
34. ISD Wireless Network U.S. application Ser. No. 09/001,363, filed Dec. 31, 1997;
35. ISD Controlled Set-Top Box U.S. application Ser. No. 09/001,424, filed Dec. 31, 1997;
36. Integrated Remote Control and Phone U.S. application Ser. No. 09/001,423, filed Dec. 31, 1997;
37. Integrated Remote Control and Phone User Interface U.S. application Ser. No. 09/001,420, filed Dec. 31, 1997;
38. Integrated Remote Control and Phone Form Factor U.S. application Ser. No. 09/001,910, filed Dec. 31, 1997;
39. VideoPhone Mail Machine (Attorney Docket No. 3493.73170);
40. Restaurant Ordering Via VideoPhone (Attorney Docket No. 3493.73171);
41. Ticket Ordering Via VideoPhone (Attorney Docket No. 3493.73712);
42. Multi-Channel Parallel/Serial Concatenated Convolutional Codes And Trellis Coded Modulation Encode/Decoder U.S. application Ser. No. 09/001,342, filed Dec. 31, 1997;
43. Spread Spectrum Bit Allocation Algorithm U.S. application Ser. No. 09/001,842, filed Dec. 31, 1997;
44. Digital Channelizer With Arbitrary Output Frequency U.S. application Ser. No. 09/001,581, filed Dec. 31, 1997;
45. Method And Apparatus For Allocating Data Via Discrete Multiple Tones U.S. application Ser. No. 08/997,167, filed Dec. 31, 1997;
46. Method And Apparatus For Reducing Near-End Cross Talk In Discrete Multi-Tone Modulators/Demodulators U.S. application Ser. No. 08/997,176, filed Dec. 31, 1997. The present application is #27 on this list.

In addition, the following two patent applications are hereby incorporated by reference:
1. U.S. patent application Ser. No. 08/943,312 filed Oct. 14, 1997 entitled Wideband Communication System for the Home, to Robert R. Miller, II and Jesse E. Russell, and
2. U.S. patent application Ser. No. 08/858,170, filed May 14, 1997, entitled Wide Band Transmission Through Wire, to Robert R. Miller, II, Jesse E. Russell and Richard R. Shively.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks. Further details of the FMP are contained in application #21 listed above.

The NSP 36 may provide a massive cache storage for various information that may be provided across the SONET 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services. Further details of the NSP 36 are contained within application #24 listed above.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment. Additionally, the service provider may collect fees from advertisers to subsidize the cost of the equipment.

Figure 2:
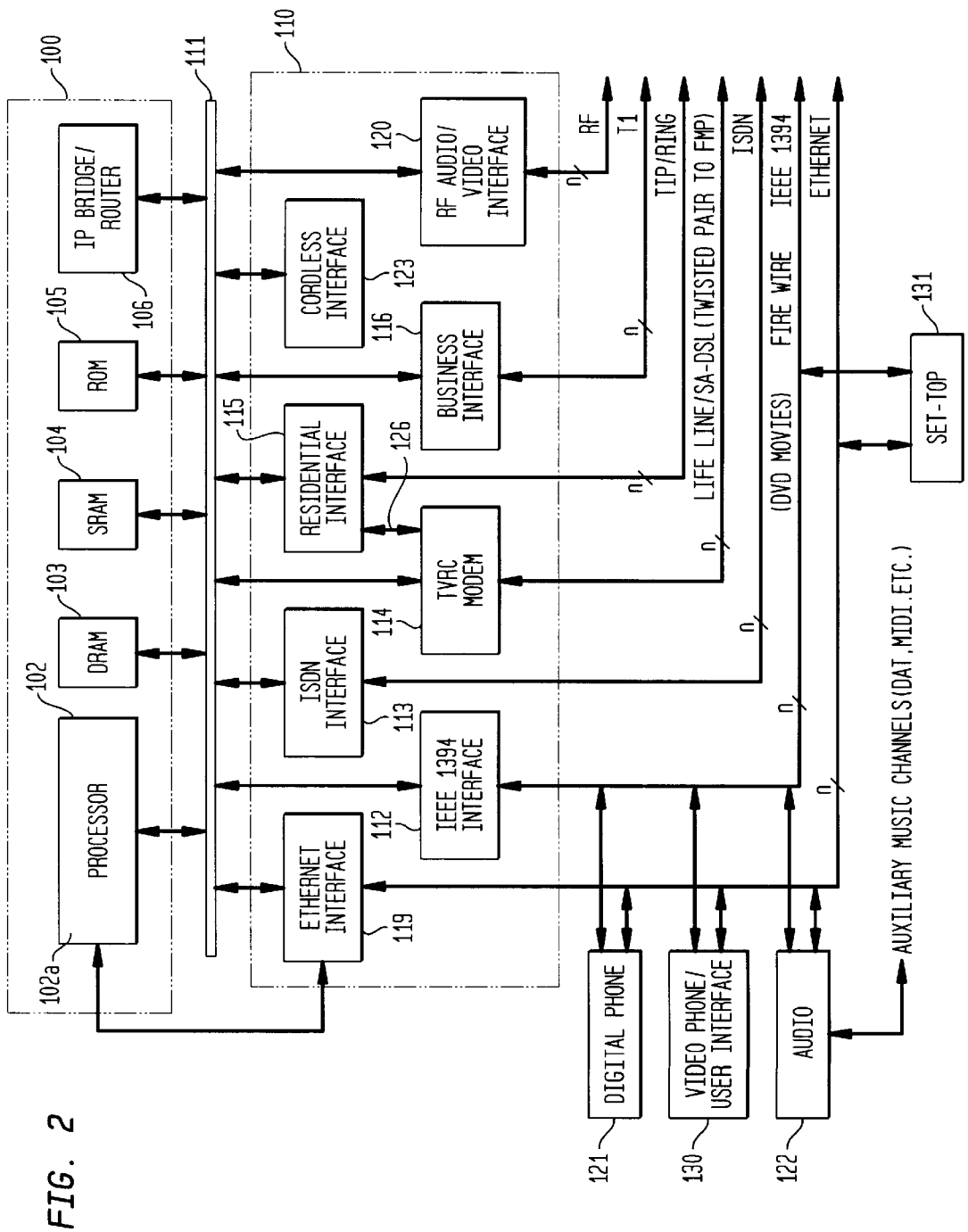
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires, fiber, and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem. Further details of ISD 22 are contained in application #32 listed above.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (for example, 28.8 kbps data, 56 kbps data, or ISDN or any suitable bit rate service), an IEEE 1394 "fire wire" interface 112 (e.g., for a digital videodisc device (DVD)), a digital subscriber line (DSL) modem (for example, a TVRC modem, 114), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, digital video disc or other media player/recorder (DVD), etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131. For example, as will be further described herein, a user may establish a user profile of interests at an NSP 36 which collects information and channels for retrieval by the user at various intelligent devices connected to the ISD 22.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the videophone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22 (see FIG. 17 and attendant description). The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being pre-configured to select the desired video clip/movie in real time for immediate viewing and/or into storage for later viewing.

Figure 3A:
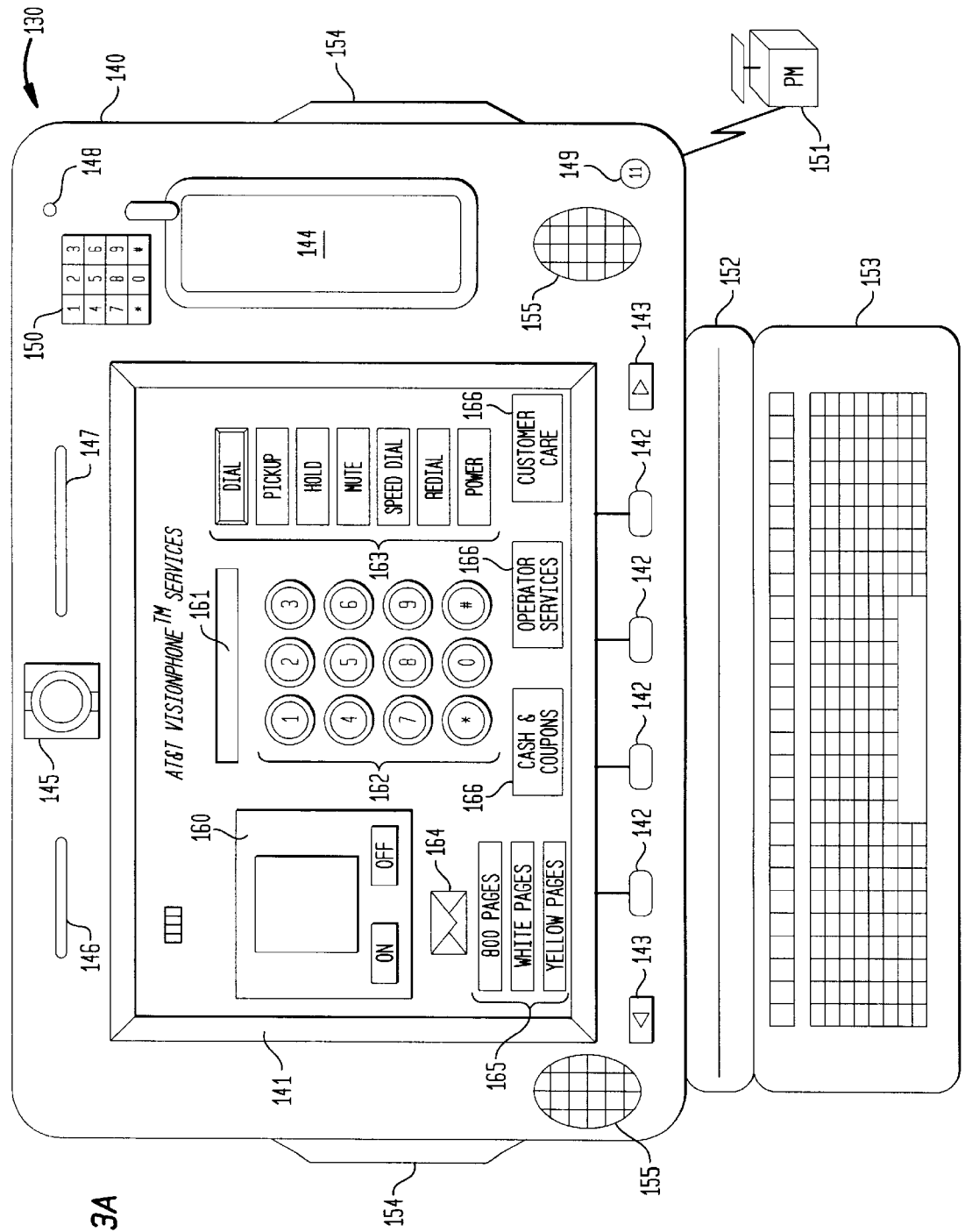
FIGS. 3A and 3B illustrate an embodiment of a video phone consistent with the architecture shown in FIG. 1.
Figure 3B:
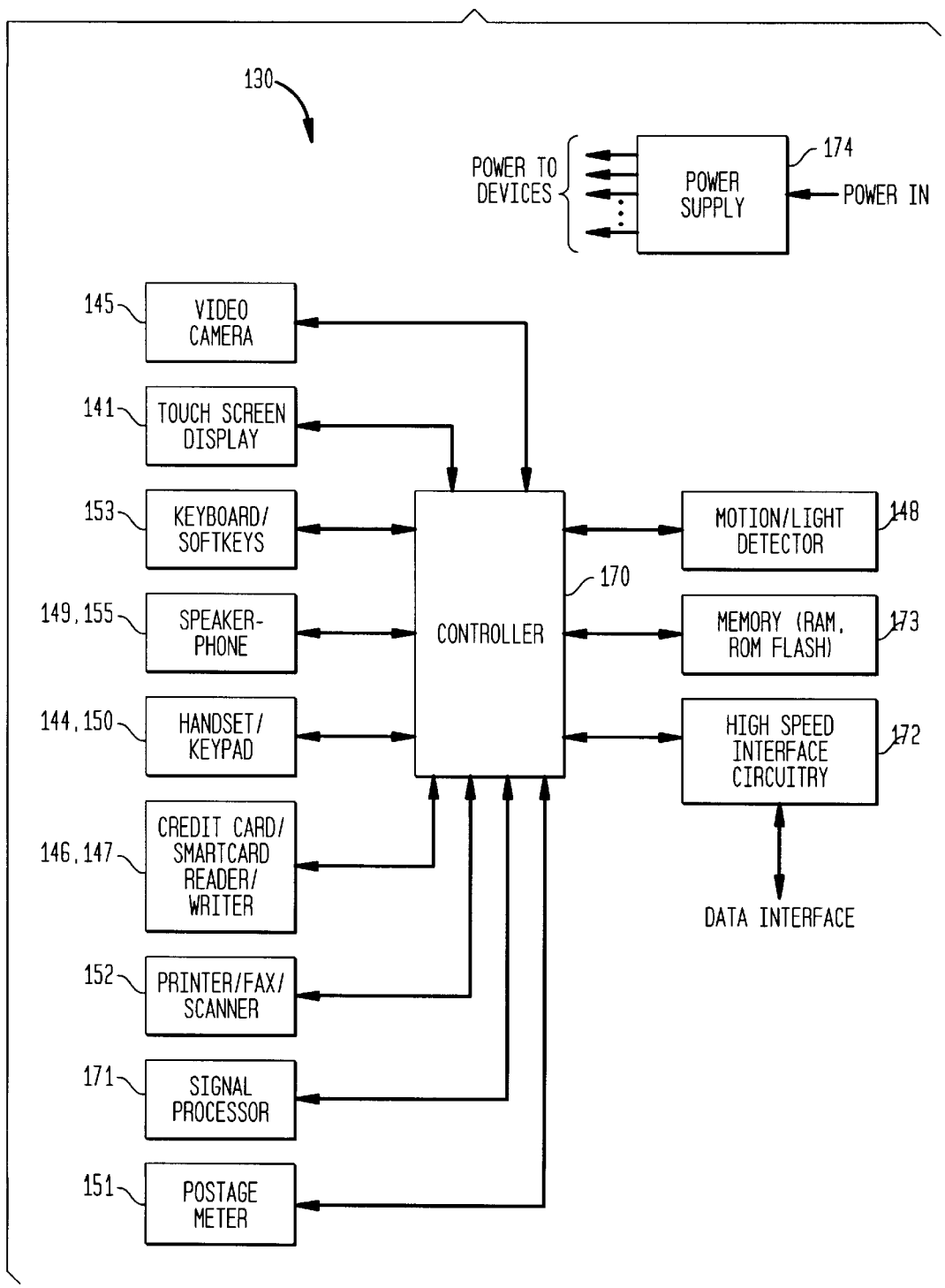

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a videophone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
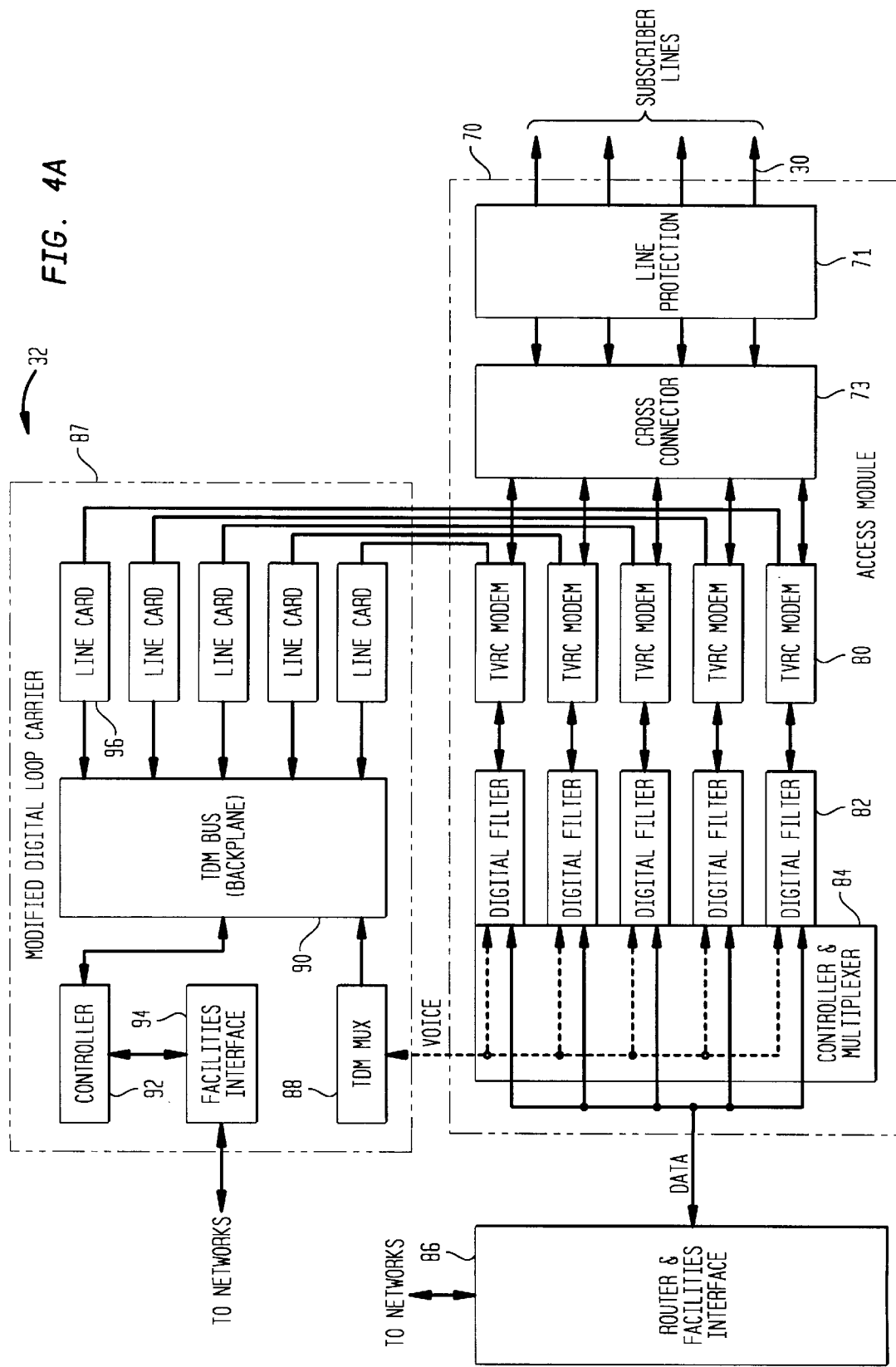
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
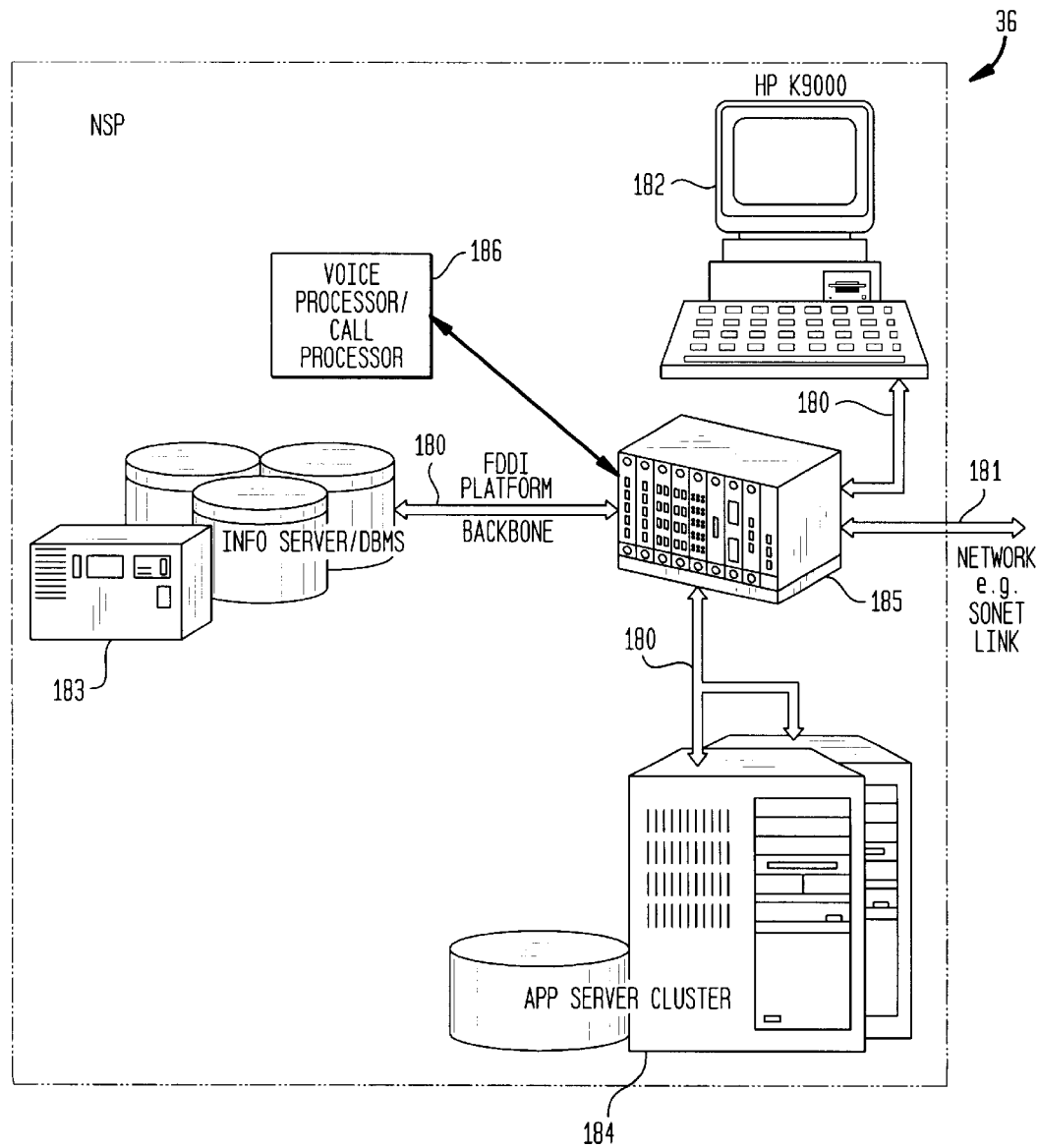
FIG. 4B illustrates a block diagram of an embodiment of a network server platform consistent with the architecture shown in FIG. 1.

Referring to FIG. 4B, the NSP 36 may be variously configured to provide any number of services provided by a server such as corporate telecommuting, information services, Internet services, pay-per-view movie services, data-base services, commercial services, and/or other suitable services. Process flow for many of these services will be described in FIGS. 9A–17. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

For high end residential consumers who want more convenience and simplicity in their daily lives and access to the information highway, the videophone is an information and telephony access service that provides a voice and touch screen customer interface to an local exchange carrier (LEC) enabling easy delivery of a wide range of telephony services with cost savings due to automated operator services, customer care, and marketing. New, enhanced services include opportunities such as interactive electronic catalog shopping from the home, advertising, and the ability to offer fast Internet access to every household, penetrating those markets that currently lack in home personal computers. Additional services include, high fidelity voice and touch screen customer interface for users to a access the network server. This is accomplished via asymmetric high speed data transport. With the higher data transfer rates, $3^{rd}$ party bill payment, banking, smart card ATM transactions, multicast program delivery service, electronic delivery of consumer product coupons, interactive video teleconferencing, state-of-the-art networking for work-at-home environments, private line services electronic shopping from the home, electronic coupons, advertising, and access to high speed Internet access. These are only a fraction of the possible services that are available, the number only limited by the imagination of one of ordinary skill in the art.

Implementation of this new architecture allows for differentiation of local service, will provide new revenue streams from value-added services, and have the potential to significantly reduce operational costs. The architecture is constructed such that additional performance benefits from the existing loop plant are extracted and maximizes use of the existing infrastructure and current systems.

The new architecture implements active services where the user triggers a stimulus by touch, voice or a combination of touch and voice commands to obtain a network based response to expand traditional services as well as provide entirely new services. These responses and the associated services include call connection, information delivery, trigger network response, and performance transactions.

Call connection services provide for calls to be initiated by touching icons corresponding to the called party. It also enables self scheduling of conference calls without the need for an operator as well as initiation of interactive calls with white board augmentation. Class services can likewise be invoked via icons and prompts in a natural manner without requiring memorization of numerical codes.

Information delivery services provide for a simple user interface that enables data base and search engine technology (formerly accessible only to networked computers) to be leveraged for telephony services. For example, access to regional, national or international electronic interaction with yellow and white page directories (FIG. 15), navigation and access for voice, e-mail, and fax messages, review of AT&T bill for services (FIG. 12), review of AT&T calling plans, review of CLASS and other service offerings. Thus certain marketing, operator services, billing, and customer care functions can be accessed by the customer without the need for an intermediate service representative, thus reducing operations cost while increasing customer convenience. The video phone eliminates the need for an intermediary to call up information on a screen and read it to the customer and streamlines customer access to information.

The trigger network response provides a screen interface that enables the customer to obtain operator services without accessing a human operator, obtain credit for wrong numbers automatically, view rate tables, self provision an AT&T Calling Plan or other CLASS services, conduct conference calls, or define a user profile for pointcast on a "ticker tape" that scrolls desired information on the videophone screen. Other trigger services could include a wake up service that automatically calls the user at a preselected time.

Performance transactions allows users via the videophone and its associated card swiper to enable users to perform transactions with security protection. These transactions include paying regular bills with paperless transactions, perform electronic banking including obtaining smart card cash in the home without the need to visit a bank or an ATM machine, conduct E-commerce, purchase products advertised on television via a synchronized ordering screen. The electronic bill payment scheme not only benefits the user but allows the service provider to obtain additional revenue by allowing those companies to out source bill payments to AT&T.

Passive services can also be offered so that active customer responses are not required. These include advertising, providing electronic coupons, personalized news delivery services, and access to community news such as school closings. Providing an advertising feed directly to the customer premises equipment provides a new and potentially very large business opportunity to the local access network provider. Advertising can be displayed on the video phone, whenever the videophone is not in active use. User profiles maintained on the network would enable the advertisements to target customer interests, geographic location, demographics, or some other criteria.

Providing electronic coupons is another passive service opportunity. The electronic coupon can be displayed on the touch screen at appropriate times throughout the day (e.g., orange juice in the early morning) as "screen savers." By swiping their smart card customers can electronically collect such coupons and use them at the store without the inconvenience of cutting them out of newspapers, etc. At the same time AT&T participates in the coupon industry and has access to another revenue stream.

Delivery of personalized news leverages diverse content assists in the creation of user profiles (FIG. 17). In addition, emergency broadcasts relating to flash flood warnings, tornado, and hurricanes, can be broadcast to users in the affected areas without affecting the user's other transactions that are occurring simultaneously. These emergency signals could also be sent with alarms for waking up and alerting users to potential natural disasters.

The offering of interactive services include the combination of a graphics capable touch screen videophone, simultaneous voice and data capability, and a high speed data line to furnish a superior user interface than a traditional voice telephone and so enables a rich collection of new interactive services. These include multimedia enhanced voice calls, virtual PBX services, point and click conferencing, intelligent call management, access to the Internet, and a universal multimedia mailbox.

The multimedia enhanced voice calls allows users to supplement voice calls with whiteboard graphics or text. The multimedia format can provide improved customer care, enhanced catalog ordering, and interactive voice and data response applications. In addition, information-on-demand and support for work-at-home access is also provided.

The virtual PBX services include screen pops for message/call alerting, and graphical call management using touch interface with call setup/bridging capabilities. Point-and-click conferencing provides a graphical user interface to initiate POTS calls. The intelligent call management system provides easy instructions to direct call management maintaining a personal registry, mobility manager, call scheduling and "call me back" services, and a personal assistant.

Access to the Internet without a personal computer or modem via Internet Service Provider (e.g., WorldNet) can be provided allowing users without access to a personal computer to have access to e-mail, the World Wide Web, a universal multimedia mailbox with voice, text, audio, and images integrated with a common interface capabilities.

The flexibility of the new architecture allows for implementation of services in phases to minimize impact on the local infrastructure and to allow the service provider to handle and support problems with implementation of services. As installation procedures become routine, additional services can be phased in based on customer demand. Early phases can be target marketed to specific demographics or to regional implementation.

For example, the initial implementation can be tailored to customers who already have two or more twisted pair connected with the local office. The videophone can contain Win32 application programable interfaces (APIs) supporting TCP/IP, POP3, RAS, and TAPI protocols with a built in browser. One of the twisted pair will access the AT&T server via a modem (28.8 or possibly 56 kbps). The second twisted pair is used for switched telephony and managed via a graphical user interface. An AT&T server at a WorldNet services center could provide access to white and yellow page directory information, calling plan descriptions, and rate tables. Other interfaces could provide access to the WorldNet Internet services such as the World Wide Web, e-mail, advertising, and E-commerce platforms.

A requirement of the touch screen services is availability of a data link to the server. In later phases of implementation, a DSL link to the home is provided with an access protocol that supports simultaneous voice and data services. In the initial phase, the simultaneous voice and data capability is approximated by having the data line automatically call the WorldNet POP when a built-in motion detector is triggered by someone nearby. During these periods of local presence, the AT&T server will put up advertising and personal information on the screen and be available to support touch activated services (e.g., calling, CLASS services), and directory information delivery. All of the line signaling for voice calls to the LEC switch (e.g., DTMF, flash hooks, etc.) for class services and dialing can be generated by the video phone processing engine in response to touch screen commands with support from the second twisted pair for client/server connection as needed.

Later phases of implementation can include the introduction of ADSL access to the customer equipment premises expanding the range of videophone services. ADSL will support 7 kHz high fidelity voice and a touch screen customer interface to the network server. This will provide easier delivery of a wider range of telephony services with cost savings due to automated operator services, customer care, billing, provisioning, and marketing. The enhanced services such as $3^{rd}$ party bill payment, banking, smart card ATM transactions, electronic shopping from the home, electronic coupons, and advertising can be implemented with the ADSL connection. In addition, high speed Internet access is possible as well as extending Internet capabilities to users who lack personal computers. Voice calls can be made with a packet-to circuit translator (PCT) for interfacing voice telephony with the local office using the TR-303 signaling simulating modified digital subscriber loop access to the local office.

Figure 6:
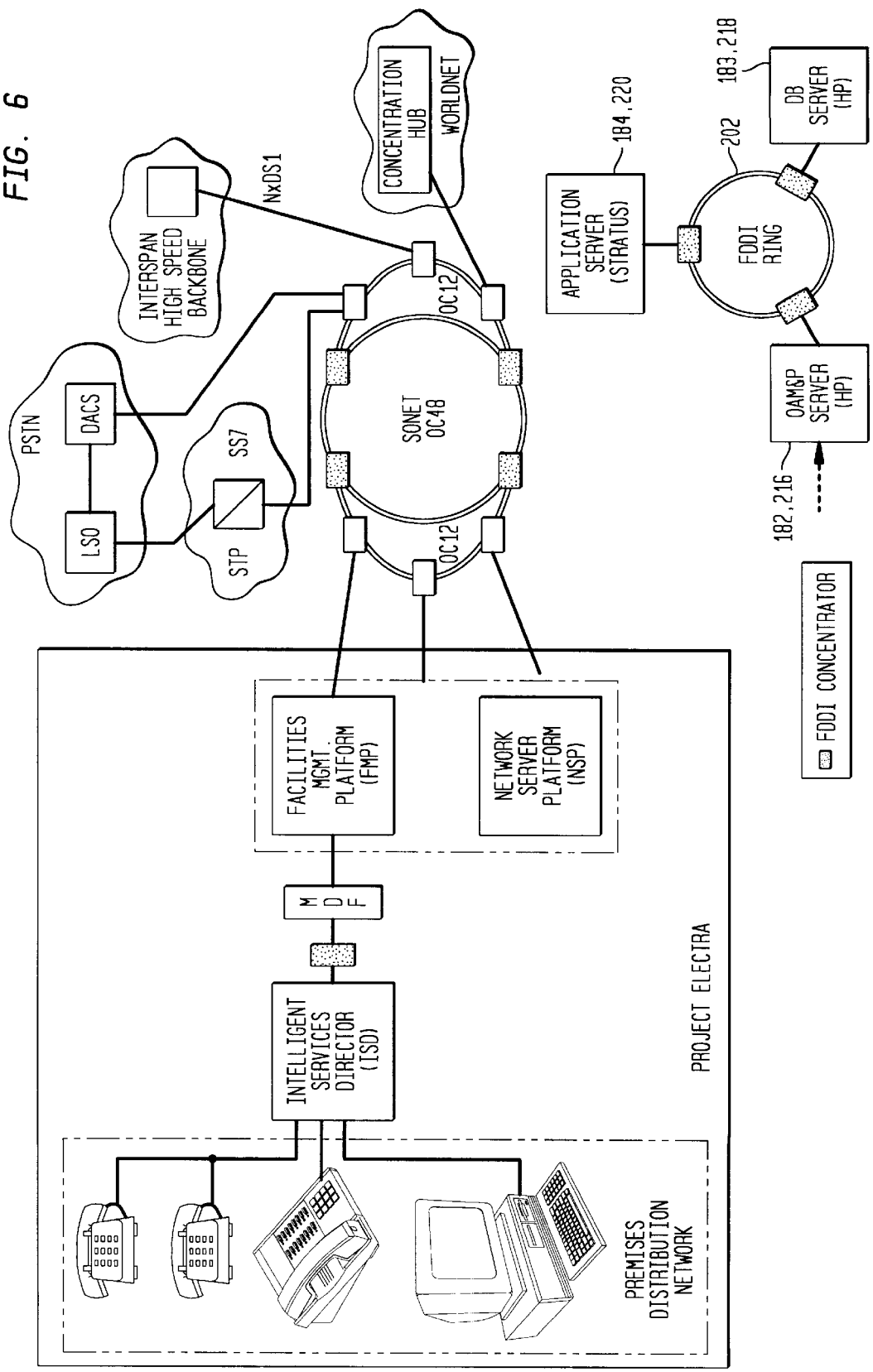
FIG. 6 illustrates a block diagram of the FDDI interface located within the NSP.

FIG. 5 illustrates a block diagram of the NSP 36 (FIG. 1) consisting of devices and services used in the implementation of the new architecture. Connected to the SONET trunks 40 and 42 is a gateway 210. The gateway 210 might also function as the router 185 that was previously discussed. Located around a FDDI ring 202 are the management server 182, 212, the information database server 183, 218 and one or more application server clusters 184, 212, as illustrated in FIG. 6.

The connection manager 214 initiates and terminates the placement of telephone calls, while managing the services and messaging. In a typical scenario, the connection manager 214 automates the calling process. This automation involves the executing of computer commands to search records in the database server 218 to ensure that the customer is a subscriber to the desired service or that the called number is a subscriber to the desired service. In addition, the connection manager 214 uses the operations, administration, maintenance, and provisioning 216 to track billing information. After the connection manager 214 obtains the required authorization, it launches the application 212 from the application server 220.

The operations, administration, maintenance and provisioning (OAM&P) server 182, 212 contains OAM&P management information 216 consisting of data relating to configuration, capacity, fault, order, traffic activity, design, security, surveillance and testing of the network. The information/database sever 183, 218 contains specific customer information such as user profiles, authorization levels of service, provisioning and electronic commerce. The application server clusters 184 manage and track information regarding computer boot operations and initializations, call management, fault recognition and recovery (FR&R), application binding, maintenance and design, application invoicing, craft interface enhancement, application downloads, translation (Xltn), recent change and verify (RC/V), authorizations and registrations, configurations and performance statistics (Pertf Stat).

Figure 7:
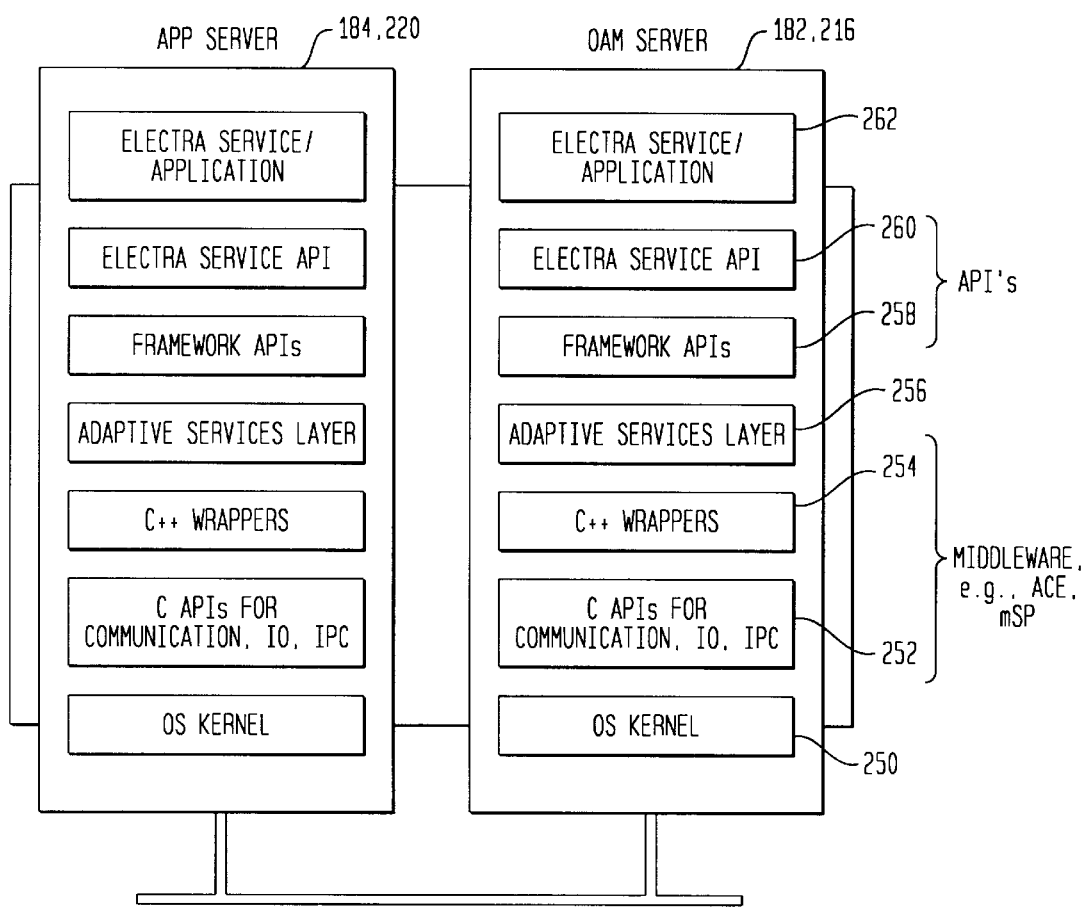
FIG. 7 illustrates the protocol hierarchy of the software layer architecture.

FIG. 7 illustrates the software layer architecture for the application server 184, 212 and the operation, administration and maintenance (OAM) server 182, 212. In both the application server 184 and the OAM server 182, the software layer architecture is the same. In data link layer, the operating system kernel 250 contains a C or other application programable interface 252 for interfacing with communication, input/output and interprocess communication protocol (IPC). The data link, network, and transport layer contain middleware including the C applications 252, C++ wrappers 254 and the adaptive services layer 256. The C++ wrappers optimize the C library functions and the middleware puts intelligence into form object oriented programs in the transport layer to help applications route upwards and downwards in the protocol hierarchy. The session and transport layers contain service applications 260 and framework applications 258, respectively. The application layer contains the service/applications 262.

Figure 8:
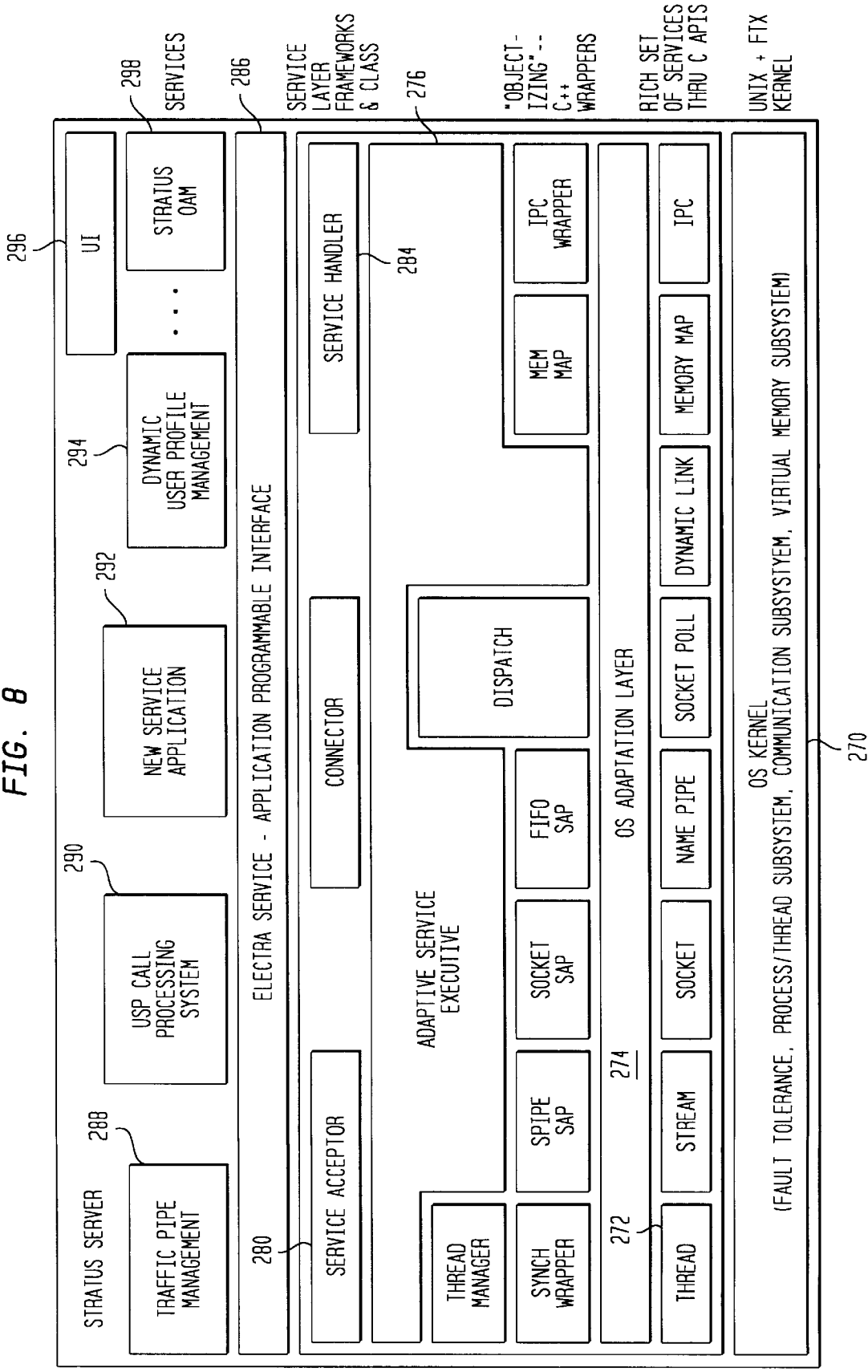
FIG. 8 illustrates the protocol hierarchy of the application server platform software architecture.

FIG. 8 illustrates protocol hierarchy for the application server platform software architecture. The physical layer includes the operating system kernels 270 for fault tolerance, process/thread subsystems, communication subsystems, and virtual memory subsystems. The data link layer contains the following C application programable interface sets 272: thread, stream, socket, name pipe, socket poll, dynamic link, memory map, and IPC. By thread is intended a slow speed data channel of possibly bursty data; a stream is a binary digital data stream; and a pipe is a wide bandwidth channel that may comprise several streams. The network layer contains the operating system adaption layer 274, the thread manager, synch wrapper, spipe SAP, socket SAP, FIFO SAP, MEM MAP, and IPC wrapper. The transport layer contains the adaptive service executive 276 and the dispatch 278. The session layer contains the service acceptor 280, connector 282 and service handler 284. The presentation layer contains application program interface 286 and the application layer contains the traffic pipe management 288, the universal signal processing call processing system 290, new service applications 292, dynamic user profile management 294, user interfaces 296, and the OAM&P services 298. These protocols use a fault tolerant Unix language to make the transition between interfaces transparent.

Figure 9:
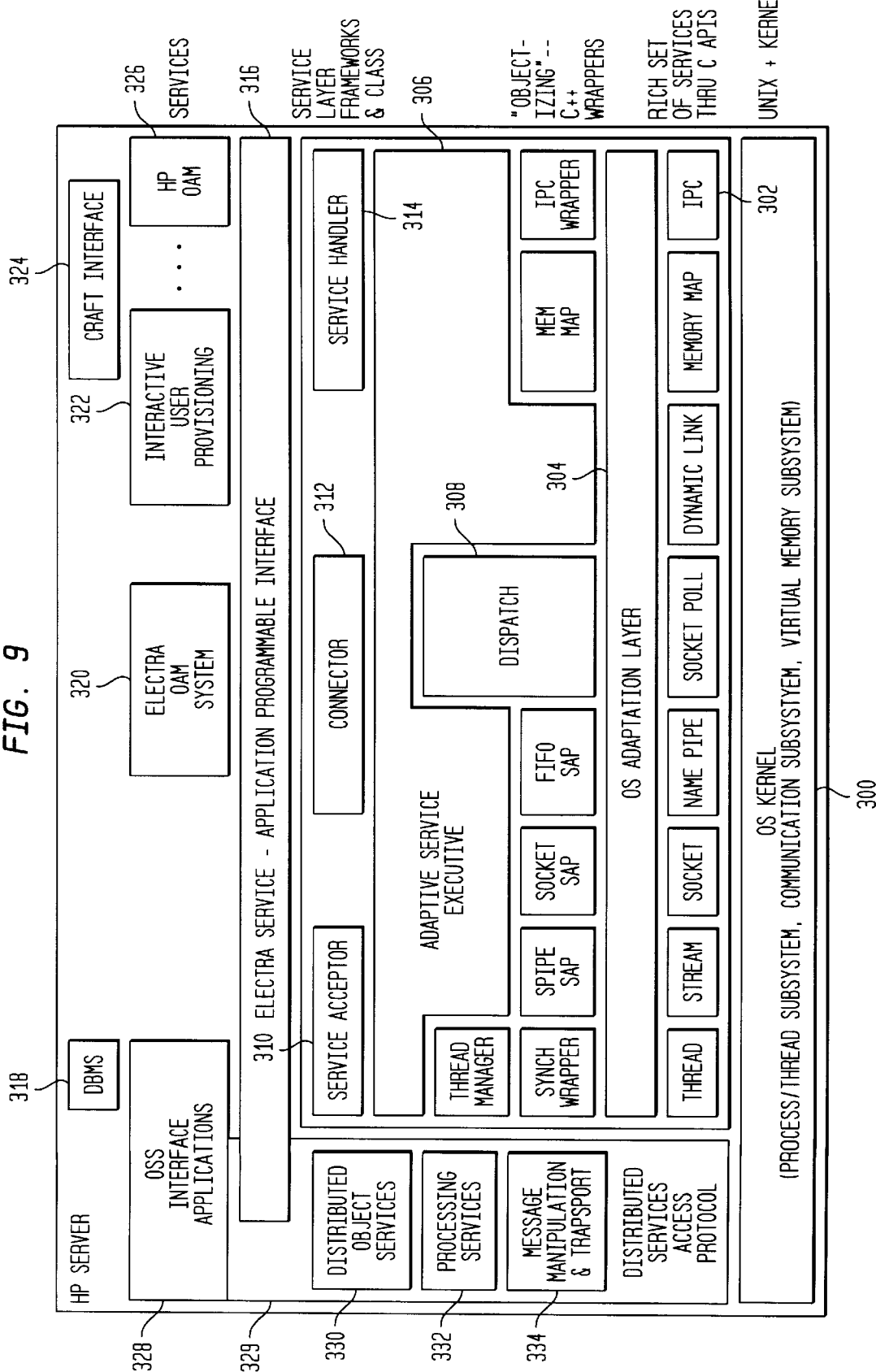
FIG. 9 illustrates the protocol hierarchy of the OAM&P server platform software architecture.

FIG. 9 illustrates the protocol hierarchy for the operations, administration, maintenance and provisioning (OAM&P) server platform software architecture. The physical layer includes the operating system kernels 300 for fault tolerance, process/thread subsystems, communication subsystems, and virtual memory subsystems. The data link layer contains the following C application programable interface sets 302: thread, stream, socket, name pipe, socket poll, dynamic link, memory map, and IPC. The network layer contains the operating system adaption layer 304, the thread manager, synch wrapper, spipe SAP, socket SAP, FIFO SAP, MEM MAP, and IPC wrapper. The transport layer contains the adaptive service executive 306 and the dispatch 308. The session layer contains the service acceptor 310, connector 312 and service handler 314. The presentation layer contains application program interface 316. The application layer contains the database management system (DBMS) 318, the OAM&P system services 320, the interactive user provisioning 322, craft interface 324 and the HP OAM 326.

The OSS interface applications 328 are supported by the distributed services access protocol 329. The distributed services access protocol 329 is supported by the session layer distributed object services 330, the transport layer process services 332 and the network layer message manipulation and transport 334. These protocols also use a fault tolerant Unix language to make the transition between interfaces transparent.

Figure 9A:
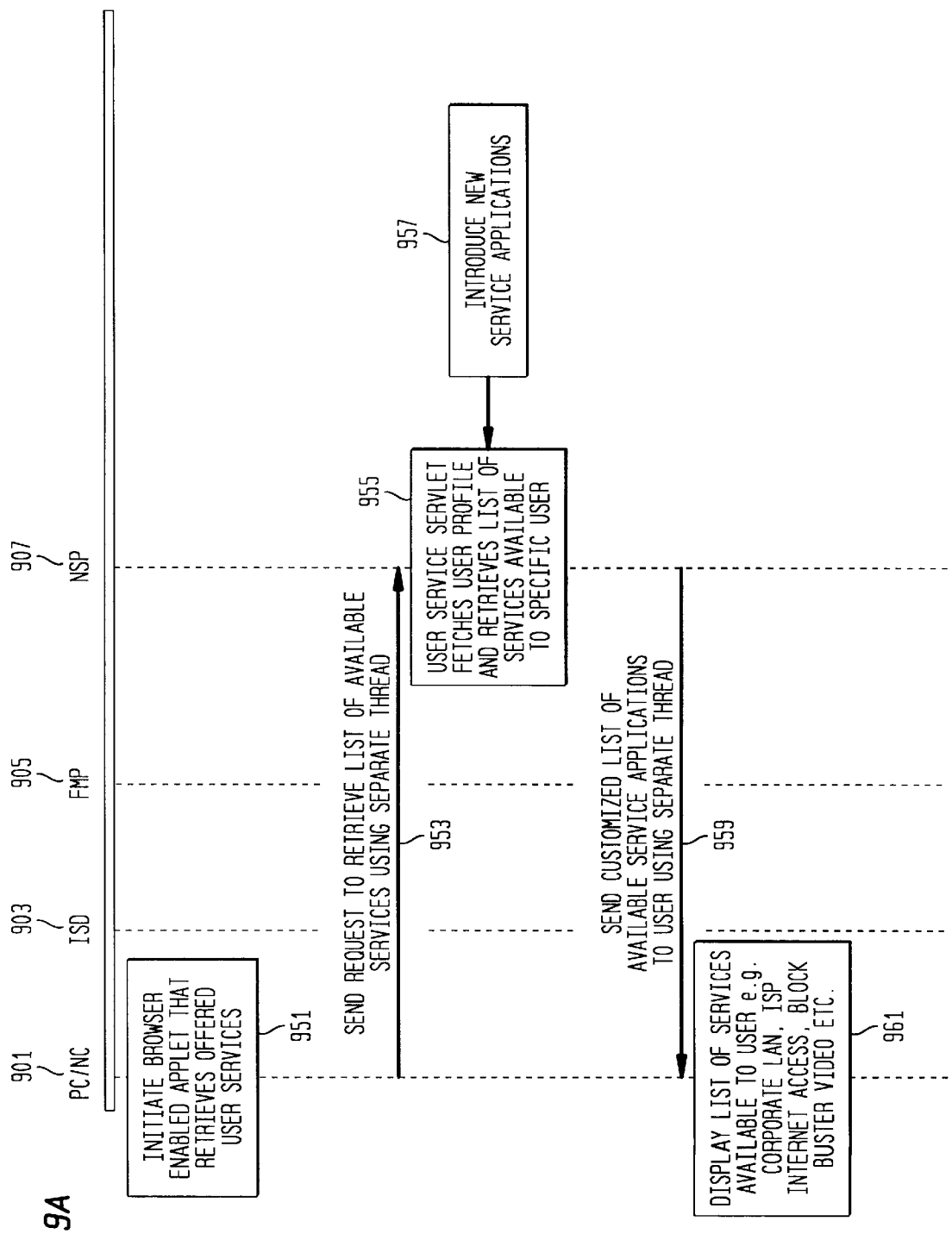
FIGS. 9A and 9B comprise service processing flow diagrams for the network server platform (NSP) of the present invention.
Figure 9B:
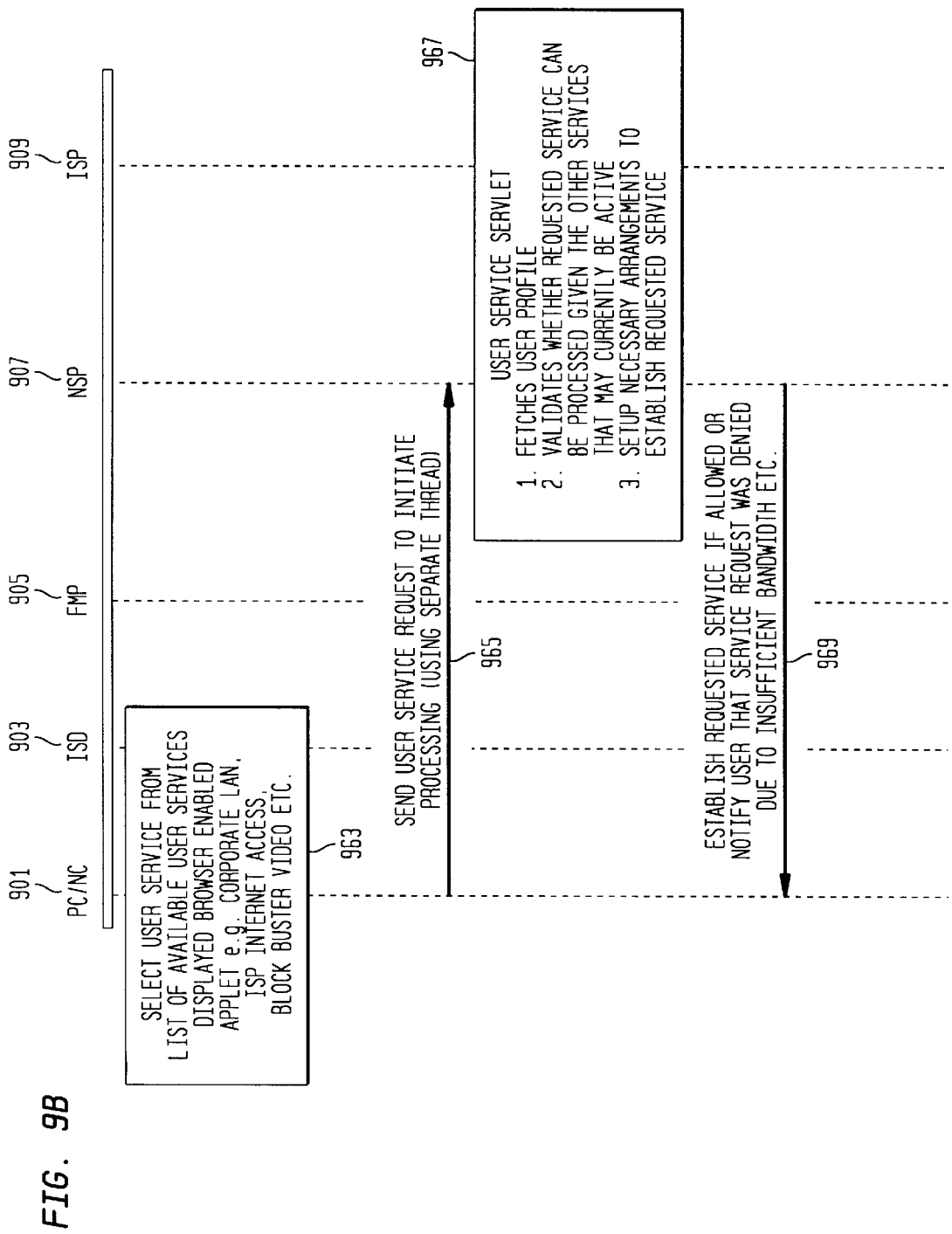

FIGS. 9A and 9B comprise service processing flow diagrams for the network server platform (NSP) 36 (FIG. 1) of the present invention. FIG. 9A shows service processing by the NSP 907 from the time a user logs on to their personal computer (PC) (PC 14 of FIG. 1) or network computer (NC) 901 to the time a menu list of accessible services is displayed on the user's computer display. FIG. 9B shows service processing from the time the user selects an available service to the time either service is allowed or denied. Referring briefly to FIG. 1, the personal computer, network computer and other home devices CPE 10 interface to an Intelligent Services Director 22 shown in FIGS. 9A and 9B as ISD 903. Further details describing the operation of the ISD may be found in U.S. Application Serial No. (#32). At a local serving office (LSO) or wire center is located a facilities management platform 32 (FIG. 1) shown in FIGS. 9A and 9B as FMP 905. Further details regarding the operation of FMP 905 may be obtained from reading U.S. Application Serial No. (#21). At a common carrier (toll carrier) point of presence (e.g., AT&T POP) according to FIG. 1 is shown the network server platform 36 of the present invention referred to in FIGS. 9A and 9B as NSP 907. An information service provider may have Internet or dial-up or other accessible information services provided from anywhere in any network shown in FIG. 1 and is alluded to but not further described in FIGS. 9A and 9B as ISP 909.

The service process is shown comprising steps 951 to 969. A key indicator and service process arrow are shown at the left of FIG. 9A to show service processing flow over time. A user at step 951 logs on to their computer 901 and typically using a windows application and a mouse initiates a browser enabled applet for retrieving user services. For example, an icon may appear on the user's computer display for service launch. By clicking or otherwise selecting the icon, the user initiates the transmission of a request to network server platform 907 via step 953. The request message comprises the user's identity and address so that messages may be returned to the user and command data such as a one indicating a command for returning available services. In particular, the message will suggest that the services be retrieved using a separate thread. By thread is intended a term suggestive of a link but is in fact a virtual link that may be provided in various known ways and particularly requires a slow speed or small bandwidth of data transmission capability. Referring briefly to FIGS. 8 or 9, threads are not as bandwidth intensive, for example, as a stream (data stream) or pipe (the most bandwidth intensive).

The network server platform 907 now must operate internal software algorithms for matching the identity of the user to available services. The services may be services to which the user has subscribed on a pay basis or services that are free, for example, and available over the Internet. At step 955, a user service servlet fetches a user profile for the identified user and retrieves a list of services available to that specific user. In addition, new services that may have been provisioned via the OAM&P may be determined for eventual announcement to the user. This step is shown as step 957.

A low speed data thread having been determined, at step 959, the list of available and newly offered services customized for that user is provided to the user that initiated the request at step 951. Finally at step 961, a list of available services is displayed. The icon screen disappears and a new menu screen of listed available services is displayed for possible selection. These may comprise and are not limited to, for example, the availability of connection to a corporate LAN or WAN for telecommuting. A telecommuting application of the present invention is described by FIGS. 13 and 14. Another application is information service provider (ISP) Internet access. An ISP access application is further described by FIG. 11. Another opportunity is for the user to view their service bill and make payments, etc. An NSP Integrated billing system is described by FIG. 12. Telephone directory for either personal or commercial (white or yellow pages) listings is also possible. The directory service application is further described by FIG. 15. Yet another service application is the availability of home entertainment such as digital audio and/or video program services via multicasting from a central network source. An NSP multicast application is described by FIG. 16. Other services are likewise possible in a new and unique way via the Network Server Platform (NSP) of the present invention. The variety of the service opportunities are only limited by the imagination of the service provider.

Referring now to FIG. 9B, the service processing continues at step 963. From the personal or network computer 901, the user selects a user provided service from the menu selection opportunities available to them. As already described, the user may select from corporate telcommuting, Internet access, multicast movie or other digital program entertainment and the like. Once the user has selected a service, the PC/NC 901 signals the NSP 907 via step 965. The user service request is a low bandwidth thread transmission and causes the NSP to begin the processing. The message indicates the service selected.

At NSP 907, step 967 comprises forming a user service servlet for the selected service. The user's profile of services and preferences is fetched from a database of the NSP 907. The NSP 907 then validates whether the requested service can be processed given the other services that may be currently active for other users. If the service is available, the NSP then sets up the necessary arrangements to establish the requested service.

Then, at NSP 907, the NSP signals the PC/NC 901 to establish the requested service if allowed or notify the user that service request has been denied, for example, due to insufficient bandwidth, inability to establish a link or other reason. Thus, a generic approach to providing services in accordance with the present invention has been described. Other specific applications will now be described in greater detail.

In addition to the devices disclosed in FIG. 1, FIG. 10 illustrates overall service concepts. Key aspects of the technologies employed in this architecture is the use of self-adaptive DSLs 30. The self-adaptive DSL supports sophisticated digital signal processing including high fidelity packet voice transmission and robust automatic route selection (ARS). ARS directs outgoing, business group line calls to the customer's most preferred available route allowing the customer to preselect a sequence of up to four private routes for each code point in the PSTN 46 for which a charge applies.

Included in FIG. 10 is the automated services agent 338 and an IP circuit converter 340. The automated services agent 338 supports the interexchange carrier's OSS, messaging systems, electronic commerce, and advertising systems. The IP circuit converter 340 converts IP packets into traffic suitable for transmission via electronic TR-303 or optical OC-3 standards.

Figure 13:
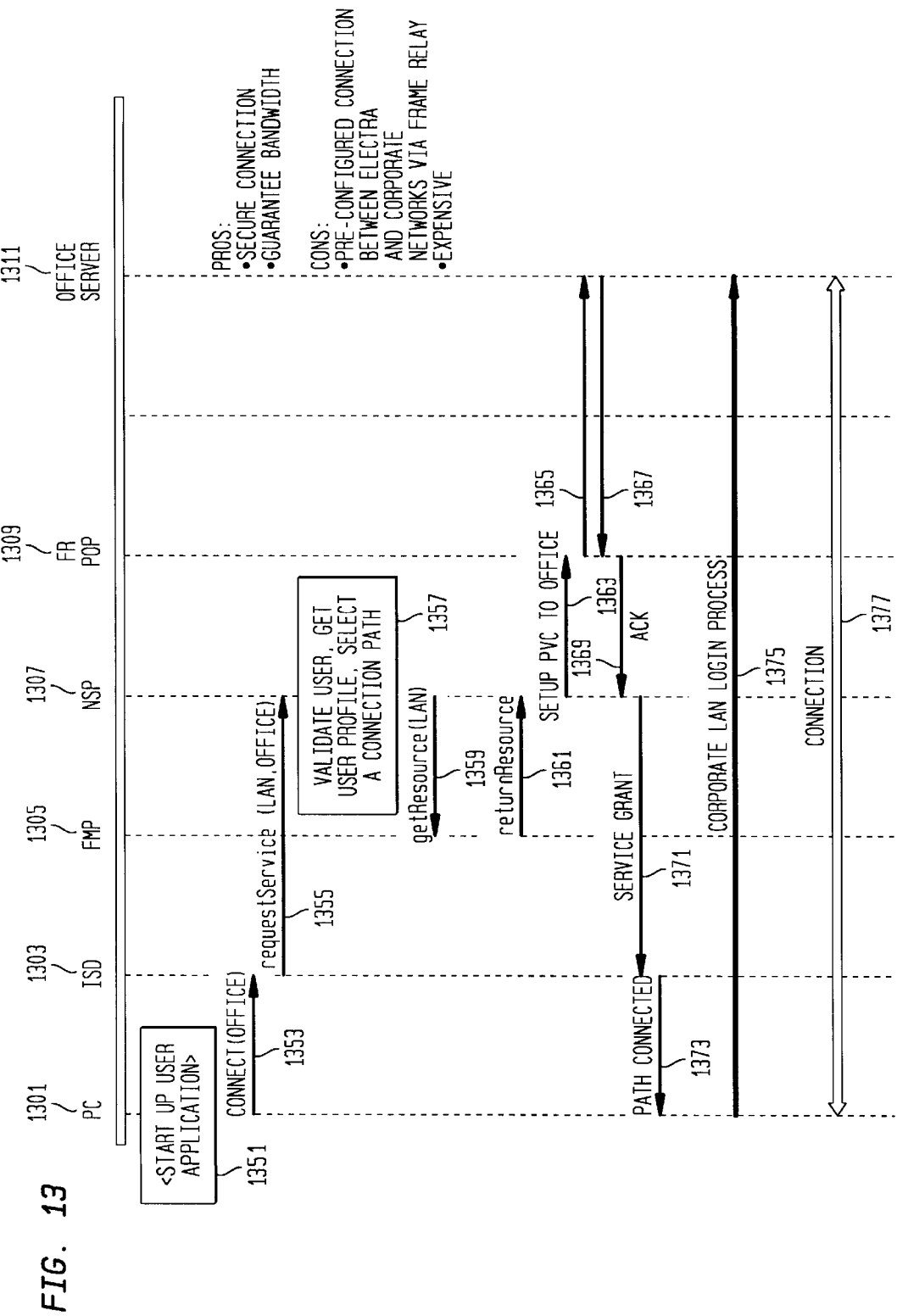
FIGS. 13 and 14 each show service process flow diagrams for providing telecommuting services from the home.
Figure 14:
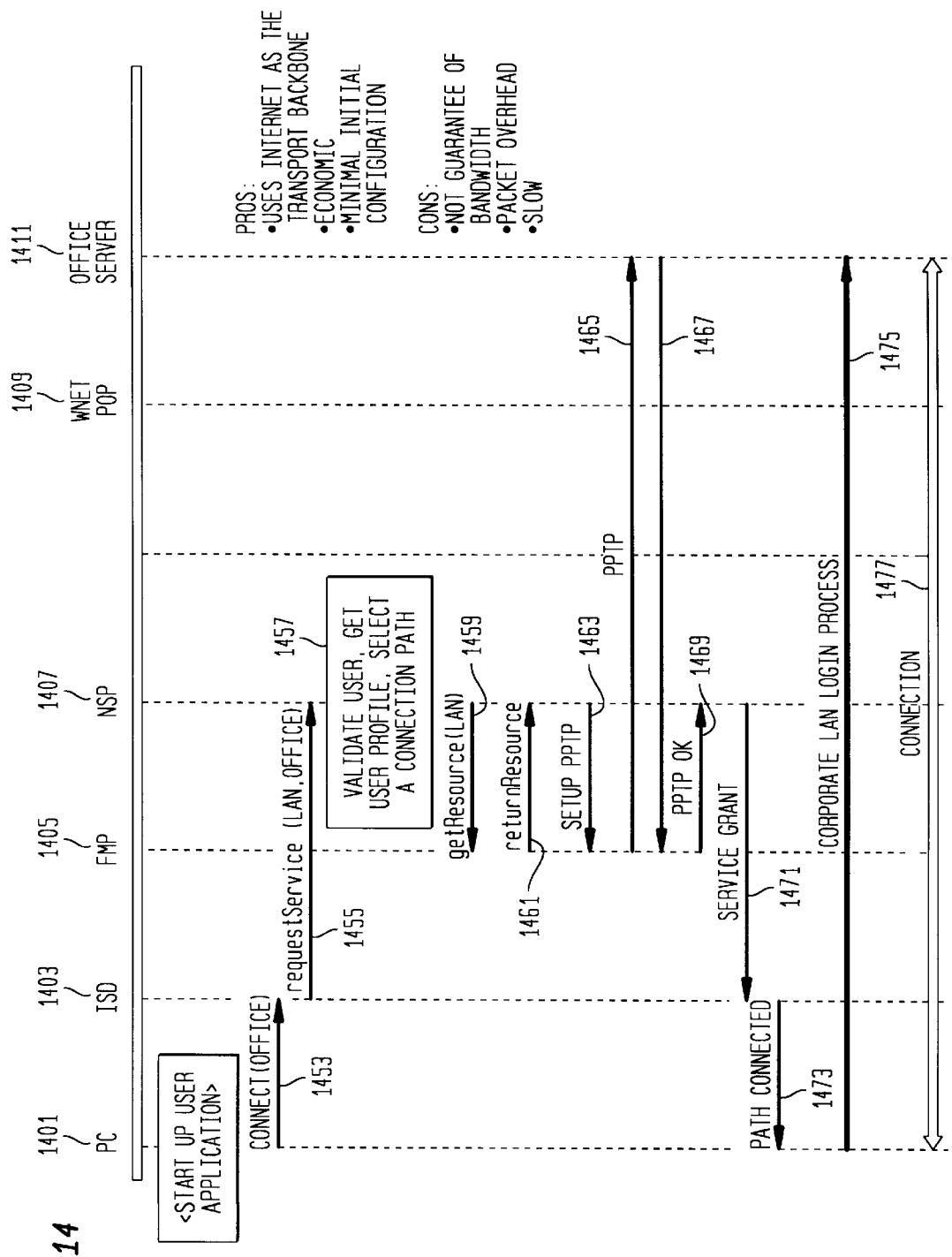

The services offered to consumers with this architecture include high speed Internet access, 7 kHz telephone voice quality service, graphical user interfaces for ease in accessing automated services, provisioning and billing. Capabilities for 7 kHz bandwidth voice calls allows for 64 kbps transmission rates with a bit error rate less than $10^{-6}$ and a delay of less than 150 millisecond. For telecommuters, in addition to the consumer services, the architecture supports high speed corporate local area network (LAN) Intranet access (FIGS. 13 and 14). For business customers, the architecture supports secure electronic commerce and personalized delivery of advertising to consumers with the capacity to tailor the advertising campaign to the consumer's profile (FIG. 17).

The architecture supports the following connectivity services: high speed Internet access (FIG. 11), CD quality voice transmission, asymmetrical and symmetrical high speed data transmission rates, two-way 384 kbps video transmission, video conferencing, wireless voice mobility within the home and possibly within the neighborhood, conversion of cellular traffic to traditional land line service within range of the ISD, wireless data mobility within close proximity to the ISD. The architecture support the following information call management services: custom local area signaling services (CLASS), call alerting and redirection, electronic commerce via access to the Internet and the use of smart cards or credit cards, multiple voice connections, telephony management, secure personalized Intranet (voice and data), access to community online information services, personalized and multiple personalized Intranet, access to interactive multimedia, and movies on demand.

Online management is also possible implementing user activated service provisioning, electronic initiated service inquiries, electronic billing and bill payment schemes, voice activated command execution, "follow-me" service profiles, and virtual home location profiles. User interface capability includes unique digital signatures, touch screen and dialing pad access to services, integrated personal computer access, smart card reading and recharging capabilities, voice dialing, compatibility with IS-136 cellular phones, compatibility with personal digital assistants, network computers and personal computers via RF modems.

Figure 11:
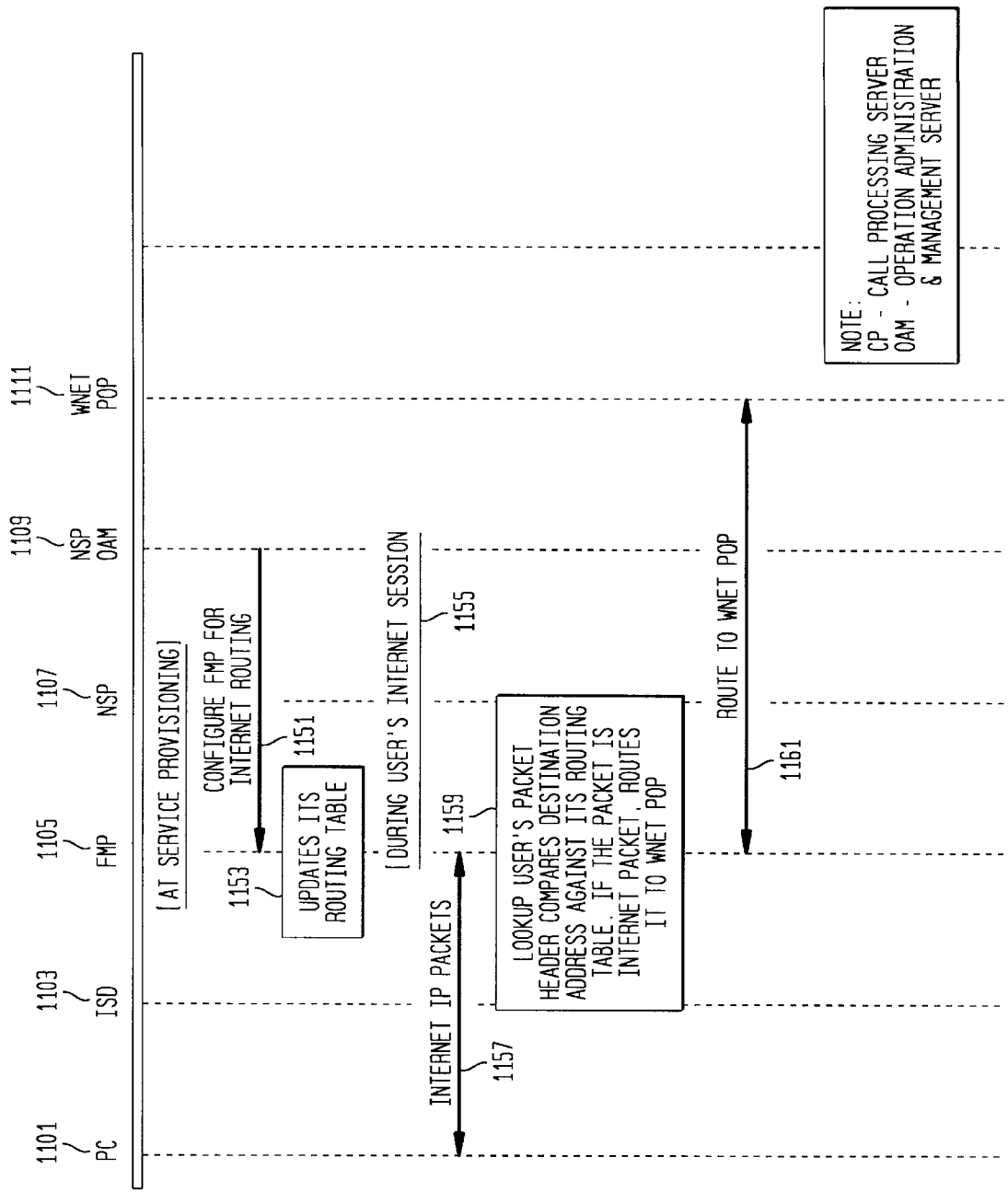
FIG. 11 is a service process flow diagram for showing how the NSP in concert with an FMP provides Internet service connectivity via, for example, an Internet Service Provider's point of presence (POP) using AT&T's WorldNet Internet service as one example.

Referring now to FIG. 11, there is shown a further example of service connectivity by an NSP 36 (FIG. 1) as already generally described by FIGS. 9A and 9B. In the application shown in FIG. 11, any user may directly connect to an Internet service provider (ISP) at great bandwidth (bit rate) without having to connect via a local exchange carrier (LEC). The same convention as previously used with respect to FIGS. 9A and 9B is used here as well. Components of the system and service architecture are shown at the top including personal computer (PC) or other terminal 1101, intelligent services director (ISD) 1103, facilities management platform (FMP) 1105 and network server platform (NSP) 1107. The Operations, Administration, Management and Provisioning server of the NSP 1107 is also shown as NSP OAM 1109. Finally, by way of example, a point of presence for an Internet service provider, namely AT&T's WorldNet service, is shown as Wnet (WorldNet) POP 1111.

As already described, bit rate to the home or premises of a business may vary but may be in excess of 1 megabit per second according to bandwidth allocation procedures followed by the ISD 1103 and FMP 1105. Thus, there is a great advantage in a user having access to the Internet connectivity feature shown in FIG. 11 because 1) the user has greater bandwidth availability and 2) has immediate access to AT&T WorldNet, for example, via NSP 1107 bypassing the LEC.

Initially, the OAM&P server of the NSP 1109 provisions the Internet connectivity service by signaling and provisioning the FMP 1105 with address, routing and other data the FMP 1105 needs. Step 1151 is directed to configuring the FMP 1105 serving the user of PC or other terminal 1101 for Internet service routing to, for example, AT&T WorldNet Internet Service point of presence 1111. As a result, the FMP 1105 updates its internal routing table of its memory with provisioned routing data for routing to Wnet (WorldNet) POP 1111.

Now, it may be assumed that a user has turned on their personal computer 1101 and wants to establish an Internet session. As already described, one of the services that may be offered the user as a menu display option is Internet service connectivity. The user clicks on or otherwise inputs their selection of Internet service connectivity. The personal computer 1101 via the ISD 1103 obtains immediate access to the already provisioned FNP 1105 at step 1157 as the user's Internet session begins. At step 1157, Internet protocol (IP) data packets are forwarded and returned via the FMP 1105. The FMP 1105 now acts as a mini-router and performs step 1159. The FMP 1105 looks up the user's packet header and compares the destination address against the routing table that was provisioned at step 1151. The routing table then provides routing data for routing the IP packets to, for example, AT&T WorldNet Internet service at Wnet POP 1111. Step 1161 suggests the routing of IP packets to the Wnet POP 1111 and an exchange of packets that follows via FMP 1105 to PC 1101. Note that the local exchange carrier is not involved and the bandwidth and data rate for exchange of Internet IP packets may be the maximum bandwidth permissible by the facility between the FMP 1105 and the PC 1101. FIG. 11 similarly describes the process of routing to other destinations of a routing table of FMP 1105 that has been provisioned by NSP OAM 1109. For example, besides serving as a gateway to the Internet, the NSP may provide a gateway to applets from a JAVA based server for such things as bill viewing and paying, utility meter reading, energy management, security services for any connected device (for example, a device at a customer premises other than a personal computer) such as the video phone described earlier or other device.

Figure 12:
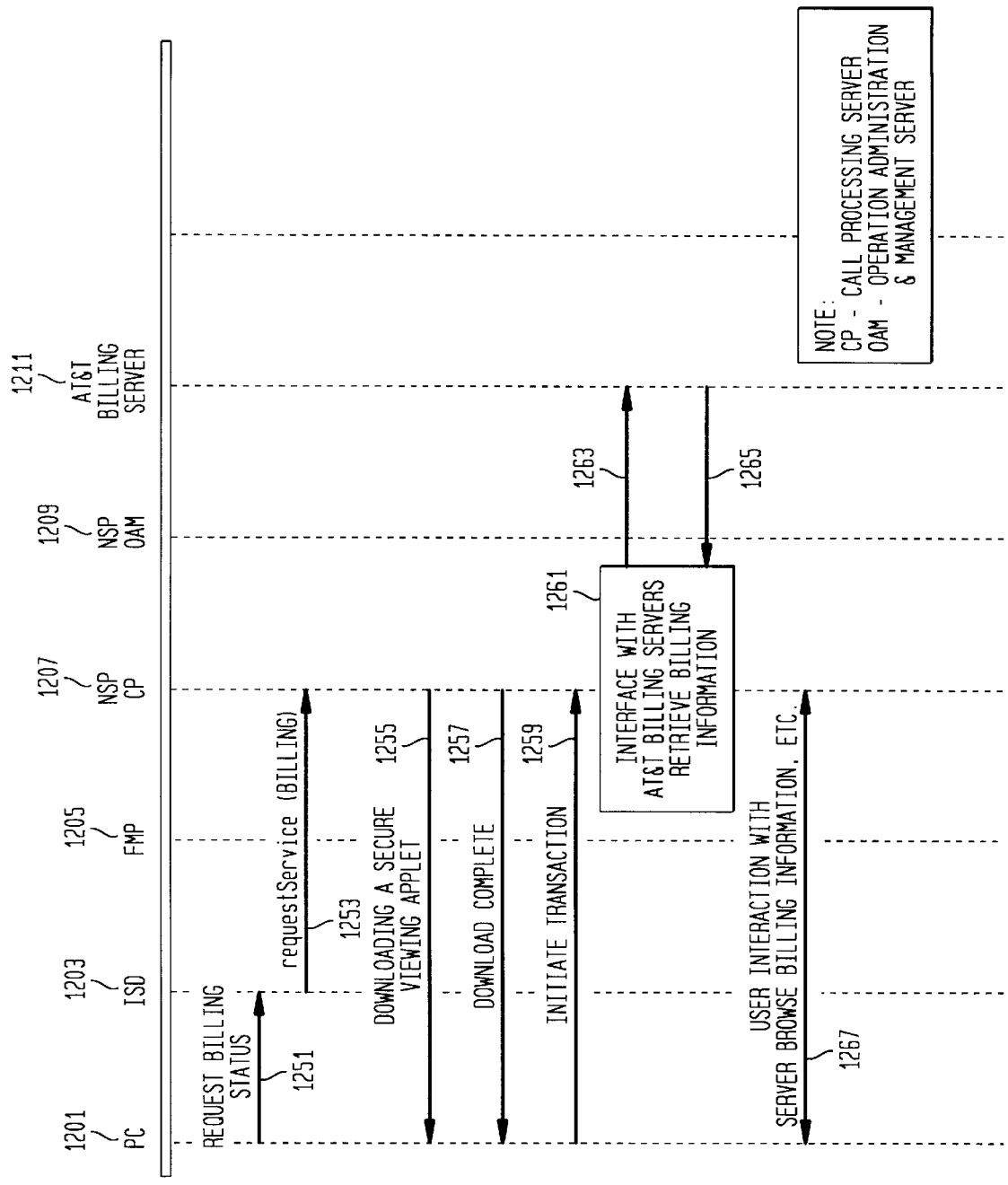
FIG. 12 is a service process flow diagram for showing how the NSP in concert with an ISD provides a bill viewing and paying service via, for example, a billing server such as an AT&T billing server as one example.

Referring now to FIG. 12, there is shown a further example of service connectivity by an NSP as already generally described by FIGS. 9A and 9B. In the application shown in FIG. 12, any user may directly connect to a billing server that may be one for a utility, a bank, a credit card company or other creditor where an AT&T billing server is shown by way of example without having to connect via a local exchange carrier (LEC). The same convention as previously used with respect to FIGS. 9A and 9B is used here as well. Components of the system and service architecture are shown at the top including personal computer (PC) 1201, intelligent services director (ISD) 1203, facilities management platform (FMP) 1205 and network server platform (NSP) call processing server 1107. The Operations, Administration, Management and Provisioning server of the NSP is also shown as NSP OAM 1209 but is not otherwise described below. Finally, by way of example, a billing server is shown by way of example, namely an AT&T billing server 1211. One advantage of the present invention is that a billing server may comprise a clearing house for a plurality of bills. For example, an AT&T billing server 1211 may provide a bill viewing and payment opportunity for local phone service, toll phone service, Internet (for example, AT&T WorldNet service), digital audio and video program delivery services and other information and communication services.

As already described, bit rate to the home or premises of a business may vary but may be in excess of 1 megabit per second according to bandwidth allocation procedures followed by the ISD 1103 and FMP 1105. Nevertheless, a bill viewing and paying service does not require the bandwidth in either direction of data transmission as, for example, would be required for providing video conferencing. Referring to FIG. 12, the user from their personal computer, intelligent telephone or video phone 1202 requests a billing viewing and paying service as already described generally by FIGS. 9A and 9B at step 1251. Typically the user has selected an icon (for bill viewing and paying services) or the list of displayed services 961 (FIG. 9A) on a display screen by clicking on the icon. The ISD 1203 in response transmits a request message for the service to the NSP 1207 at step 1253. The message as already described must contain a service identifier, for example, BILLING. The NSP call process server 1207 responds to the message by looking to internal algorithms for billing services. In the internal algorithms it may be determined that a secure billing channel is required. As a result of the billing service look-up, then, the NSP CP 1207 downloads a secure viewing applet at step 1255 to the personal computer or other terminal 1201. The personal computer then may recognize that security is required for the service and may choose to secure, for example, by encryption or other means any future communications. The NSP 1207 and the PC 1201 must be sure that each other understands the security provisions put in place by each. Each device must know how to decrypt each other's communications by exchange any security keys and the like. Once the download is complete at step 1257, a transaction may be initiated. It may be assumed that communications within the AT&T network are secure, but communications over the local loop or other facility connecting the PC or other terminal 1201 with the NSP 1207 remote from the PC may not be as secure.

It may be assumed, by way of example, that a user has requested AT&T bill viewing and payment service. The transaction with the AT&T billing server then is initiated at step 1259 by the terminal 1101 signaling the NSP CP 1207. The interface with the AT&T billing server 1211 may be by any convenient method to the toll carrier service provider. Again, the channel is secure, within or outside the toll carrier network and may be provided with or without encryption security. At step 1263, the bill is requested and data returned at step 1265 to the NSP which converts the received data as necessary for eventual display or other use by the user. Preferably, at step 1267, the user will be able to interact with the bill viewing service by viewing any portion of the bill the user wants and may communicate and question any billing item of any service provider. Also, the user may arrange to pay the bill by providing, for example, AT&T universal or other credit card information or other payment option such as.

Referring now to FIGS. 13 and 14, FIGS. 13 and 14 each show service process flow diagrams for providing telecommuting services from the home. FIG. 13 is a service process flow diagram for showing how the NSP in concert with an ISD provides a telecommuting service via, for example, an employer's office server using a frame relay backbone to interconnect the office server and a home terminal. FIG. 14 shows a similar service process flow diagram for using the Internet to interconnect an office server and a home terminal. Home/office telecommuting is yet a further example of service connectivity by an NSP as already generally described by FIGS. 9A and 9B. In the application involving a frame relay backbone as shown in FIG. 13 or in the Internet connect mode of operation shown in FIG. 14, any user may directly connect to their employer's office server. The employee may connect to their office server without having to connect via a local exchange carrier (LEC). The same convention as previously used with respect to FIGS. 9A and 9B is used here as well. In FIG. 13, components of the system and service architecture are shown at the top including personal computer (PC) 1301, intelligent services director (ISD) 1303, facilities management platform (FMP) 1305 and network server platform (NSP) 1307. In FIG. 14, the same components are indicated prefaced by the figure number, for example, the facilities management platform is shown as FMP. In FIG. 13, a frame relay point of presence is shown as FR POP 1309. In FIG. 14, an Internet service provider point of presence is shown, for example, an AT&T WorldNet point of presence, as WNET POP 1409. In FIGS. 13 and 14, the employer office server is shown as Office SVR 1311 and 1411 respectively.

As already described, bit rate to the home or premises of a business may vary but may be in excess of 1 megabit per second according to bandwidth allocation procedures followed by the ISD 1303 or 1403 and FMP 1305 or 1405. In connections to the employer office server 1311/1411, it is desirable to achieve the greatest bandwidth or data rate possible. The employee would like to have the same access and data rate as if the employee were in fact at the location of the user's employer. In either connection of FIGS. 13 and 14, the maximum bandwidth may be achieved but may not be guaranteed in an Internet mode of corporate LAN access (FIG. 14).

Now referring to FIG. 13, the frame relay backbone approach to employee telecommuting will be discussed. While not particularly shown but suggested by FIG. 1 is the access via the NSP 36 to a frame relay backbone network off ring 42. A frame relay pop 1309 is not shown but may be provided off, for example, a SONET OC48 ring network 42. Now an employee user of the present network service actuates telecommuting service by selecting, for example, a telecommuting icon from a menu structure displayed as a result of the process of FIG. 9A. At step 1351, then, the user starts up the present telecommuting application by, for example, pointing to a telecommuting service icon and clicking or other selection means. It may be further assumed that the service may be identified by the service identifier "office". The service clicking and selection for an employer office connection is delivered to the ISD 1303 at step 1353. The ISD 1303 at step 1355 forwards an office service request message to NSP 1307 via FMP 1305. At step 1307, the network server platform performs a number of tasks. Firstly, the NSP 1307 validates the identity of the user forwarded to it by ISD 1303. The user having been validated by look up table, the user profile is retrieved showing what routing and other information is available for this user's request for LAN telecommuting service. The look-up process in NSP databases should show the accessibility to an office server 1311 associated with the user at personal computer or other terminal 1301 and, most importantly, that there exists a preconfigured connection between the FMP 1305 and the office server 1311 via a frame relay POP 1309. The NSP 1307 then provisions the FMP 1305 via step 1359 to provide resources such as LAN resources for reaching the office server 1311. Then a return message is provided by the FMP 1305 to the NSP 1307 acknowledging that the FMP is set up at step 1361. Once the NSP is satisfied that the FMP 1305 is ready, the NSP 1307 arranges at step 1363 to set up a private virtual circuit to the Office Server 1311 via FR POP 1309. Steps 1365 and 1367 show the establishment of a virtual circuit link between FR POP 1309 and Office SVR 1311. Once the PVC is set up, then an acknowledgment is returned by the FR POP 1309 to the NSP 1307 at step 1369. The NSP 1307 then forwards a service grant message to ISD 11303 at step 1371. Finally, the ISD 1303 signals the home terminal that the path is ready at step 1373. Now a communications link exists between the PC/ISD/FMP/FR POP/Office SVR. The user of terminal 1301 can begin to log in to the corporate LAN as if they were on site at step 1375. The connection is shown at step 1377 and assumes a high bandwidth connection at the maximum bandwidth the corporate LAN will allow.

Advantages of a frame relay POP mode of connection to an Office Server 1311 are that the connection is secure from intrusion and private to the user. Also, the bandwidth between the user and the corporate LAN is guaranteed. Of course, the guaranteed bandwidth comes at relatively high expense compared with Internet access and requires a pre-configured frame relay connection.

Referring now to FIG. 14, an Internet connection to an employer office server 1411 will be described. First, as before, the user indicates a preference for obtaining a telecommuting service by actuating an input signal at their terminal 1401 at step 1451. Steps 1453 and 1455 are similar to steps 1353 and 1355 but for the fact that NSP 1307 has provisioned the FMP and so the ISD to arrange for an Internet connection to an Office SVR 1411 either as an alternative to a frame relay POP connection or in place of the frame relay mode. Consequently, at step 1457, the step proceeds as before but for the selection of a connection path which now involves an Internet connection path. Steps 1459 and 1461 proceed as before except that a PPTP protocol is set up at step 1463 for data traffic to the office server. The FMP 1405 then tries out PPTP to and from the Office SVR 1411 via, for example, AT&T WNET POP 1409 at steps 1465 and 1467. If everything is ok, the FMP 1405 signals the NSP 1407 that the FMP is ready to communicate with the Office server 1411 via PPTP. The NSP replies by outputting a service grant to the ISD 1403 saying it is ok to begin telecommuting service via the Internet. At step 1473, the final step of the path to the terminal or PC 1401 is completed and the user can begin to log on to the corporate LAN at step 1475. Again, the maximum bandwidth is provided via Internet service that Internet service provides but the bandwidth cannot be guaranteed as another user at a premises where PC 1401 is located may take some bandwidth away and because within the Internet itself bandwidth cannot presently be guaranteed. Thus, the service may be slow. Also, with Internet, there is a lot of packet overhead (extra bits that are not necessarily needed for information transfer). Yet, the connection will be complete and reasonably close in service quality to a user of a corporate LAN that is on site at step 1477. The Internet approach is inexpensive and requires minimal initial configuration.

Referring now to FIG. 15, there is shown a further example of service connectivity by an NSP 36 as already generally described by FIGS. 9A and 9B. In the application shown in FIG. 15, any user may directly access white (private) or yellow pages (commercial) directory services at required bandwidth (bit rate) without having to connect via a local exchange carrier (LEC). The same convention as previously used with respect to FIGS. 9A and 9B is used here as well. Components of the system and service architecture are shown at the top including intelligent terminal, video phone or personal computer (PC) 1501, intelligent services director (ISD) 1503, facilities management platform (FM) 1505 and network server platform (NSP) 1507.

As already described, bit rate to the home or premises of a business may vary but may be in excess of 1 megabit per second according to bandwidth allocation procedures followed by the ISD 1503 and FMP 1505. Thus, there is a great advantage in a user having access to the directory services feature shown in FIG. 15 because 1) the user has greater bandwidth availability and 2) the user may immediately access directory services, for example, via NSP 1107 bypassing the LEC and 3) additional services and connections may be provided via the NSP (also bypassing the LEC) for home shopping, banking by phone, obtaining directions to a destination and the like as will be further discussed below.

Initially, the OAM&P server of the NSP 1505 provisions the directory service availability by signaling and provisioning the FMP 1505 with its address, routing and other data the FMP 1505 needs. The NSP itself 1507 has already been described as comprising a large database of data that may provide according to the present application at least local directory (both telephony and Internet) address/directory number services. Moreover, the NSP comprises significant caching memory and access to remote NSP's and other directory databases from which it may obtain further directory data.

Initial step 1551 of the service process flow diagram of FIG. 15 is directed to configuring the FMP 1505 to configure the ISD 11503 serving the user of PC 1501 for directory service routing to NSP 1507. As a result, the FMP 1505 updates its internal routing table of its memory with provisioned routing data for routing to NSP 1507 and for providing service via ISD 1503 to a particular user of terminal 1501.

Now, in step 1553, it may be assumed that a user has turned on their personal computer 1501 and wants to establish a directory session. As already described, one of the services that may be offered the user as a menu display option is directory service connectivity. The user clicks on or otherwise inputs their selection of directory service connectivity. The message forwarded as a result of the directory service can be the name, address or other indicia to be looked up. Also, a second column of the display may provide the desired output which may be directory number or Internet address but may also comprise, for example, directions for-driving to a store nearest the user. The personal computer 1501 sends a lookup message with one or more of these requests to the ISD 1503 at step 1555. The ISD 1503 in turn obtains immediate access via the already provisioned FMP 1505 at step 1557 to the NSP 1507 where the local directory is located. The NSP 1507 now acts as an information database service provider and performs steps 1559. The NSP 1507 looks up the user's requested data and determines if it can provide the requested information itself. If NSP 1507 cannot provide the requested data look-up itself, it determines routing for a database having the requested information, collects the information and stores the information in cache memory for forwarding to the user along with any locally provided database information requested. Step 1561 suggests the return of the directory lookup result to the ISD 1561 for presentation to the user. Depending on the terminal, for example, the personal computer 1501, the ISD 1503 causes the result to be displayed at step 1563. Along with the result, the display may provide immediate dialing opportunity for a telephony directory number or immediate access to an Internet addressed web site.

For example, the user may wish to obtain a white pages listing for Tom Jones. The user may not know the city. The NSP 1507 may provide a directory service that identifies all individuals named Tom Jones in a geographical area such as the state of New York for possible review and selection. The user may continue to provide information until the selection process is narrowed to the Tom Jones that the user wishes to locate. Once the result of the search is narrowed sufficiently to where the user may make a choice, the choice may include a hot spot for an immediate connection. Moreover, Tom Jones may be located, not only at home, but at his work phone, cellular phone, pager, personal computer, facsimile machine or other number or web site.

In another application, the user may be trying to locate a drug store nearest them.

The user inputs the request. Because the NSP receives data regarding the user's identity, the NSP further has access to a user profile including a home address. Consequently, using appropriate algorithms known in the art, the NSP 1507 locates the nearest drug store, the next nearest and so on for the user to chose one. Moreover, the display may provide essential information input by the drug store such as hours of operation. The hours of operation may be used as a filter to eliminate possible drug stores that in fact are not presently open at the user's request. The user may select to call the drug store of their choice and/or obtain directions from their home to the drug store.

In accordance with the directory look-up feature, the user may make repeated requests for the same or additional information. Moreover, once the user receives the directory look-up result, the result may provide hot spots or clicking selection opportunity to directly access the directory look-up result, for example, by telephony or the Internet at the highest bandwidth permissible or desirable. Thus, the directory look-up may be the first step toward home shopping, bank from home and other services. Note that the local exchange carrier is not involved and the bandwidth and data rate for exchange of Internet IP packets may be the maximum bandwidth permissible by the facility between the FMP 1505 and the PC or other terminal 1501.

Referring now to FIG. 16, there is shown a further example of service connectivity by an NSP 36 as already generally described by FIGS. 9A and 9B. In FIGS. 9A and 9B, the present service is indicated in shorthand by the suggestion that the present service is like BlockBuster Video (T1 services, being able to receive movies or video games at home without having to go to the store to bring home the video or other program for play on a player. In the application shown in FIG. 16, any user may directly access multicast program services at required bandwidth (bit rate) without having to connect via a local exchange carrier (LEC). Pay-per-view, pay-per-listen, pay-per-play and other program delivery services may be provided from one or distributed sites from which the programs are multicast. Referring to FIG. 1, briefly, the multicast programs are receivable at any NSP 36 within reach of the SONET ring network 42. Moreover, the NSP 36 comprises a database with program availability and routing information.

In describing the multicast program services application of FIG. 16, the same convention as previously used with respect to FIGS. 9A and 9B is used here as well. Components of the system and service architecture are shown at the top including intelligent terminal, video phone or personal computer (PC) 1601, intelligent services director (ISD) 1603, facilities management platform (FMP) 1605 and network server platform (NSP) 1607.

As already described, bit rate to the home or premises of a business may vary but may be in excess of 1 megabit per second according to bandwidth allocation procedures followed by the ISD 1603 and FMP 1605. Thus, there is a great advantage in a user having access to the multicast program services feature shown in FIG. 16 because 1) the user has greater bandwidth availability and 2) the user may immediately access multicast program services, for example, via NSP 1607 bypassing the LEC.

Initially, the OAM&P server of the NSP 1607 provisions the multicast program service availability by signaling and provisioning the FMP 1605 with its address, routing and other data the FMP 1605 needs. The NSP itself 1607 has already been described as comprising a large database of data that may provide according to the present application routing information needed for periodically receiving data from remote multicast server locations regarding availability to the user and routing information for receiving multicast programs. As is well known in the art, multicast audio and video programs may be provided in compressed format such as MPEG compressed format or other compression format. The compressed program is decompressed preferably at the terminal 1601. On the other hand, if the terminal is not so equipped, decompression algorithms may reside in the ISD 1603.

Initial step 1651 of the service process flow diagram of FIG. 16 is directed to configuring the FMP 1605 to configure the ISD 1603 serving the user of terminal or PC 1601 for multicast program routing to NSP 1607. As a result, the FMP 1605 updates its internal routing table of its memory with provisioned routing data for routing to NSP 1607 and for providing multicast program services via ISD 1603 to a particular user of terminal 1601.

Now, in step 1653, it may be assumed that a user has turned on their personal computer or other terminal 1601 and wants to establish a multicast program session. As already described, one of the services that may be offered the user as a menu display option is a multicast program delivery service connectivity. The user clicks on or otherwise inputs their selection of multicast program service connectivity. The menu screen displayed as a result of the multicast program service can be tables of indicia to be looked up. For example, you know you want to see a movie starring Jimmy Stewart. You also know it is a Christmas movie. Using various selection algorithms within the design skills of one in the art, the selection may be narrowed to the well-known movie "It's a Wonderful Life" starring Jimmy Stewart about Christmas. Also, a second area of the display may provide the desired output which may be directory number or Internet address with information about the movie but may also comprise, for example, directions for driving to a movie theater nearest the user if the user wishes to see the movie at a theater instead of at their home terminal.

At step 1653, the user makes a selection of a video or other program title. As already described the program title may comprise a movie title, an audio album or song title and the like by program, title and artist or a game program or software program for download. At step 1655, the program title selection is forwarded to the ISD 1603. The ISD 1603 then formats a service request message describing the program to be delivered and service identifier data such as data representing a VIDEO service. The message is transmitted from the ISD 1603 via the FMP 1605 serving that ISD 1603 at step 1657 to NSP 1607.

At step 1659, the NSP 1607 validates the user and the requested service and obtains the user's profile from database memory. The user profile may provide the user's home address for locating a movie theater nearest them playing the desired movie or certain predetermined movie or other program preferences that can be used as a guide. Then, the NSP searches its database for movie or other program routing data to access the multicast program source and seek a download of the compressed program data.

Meanwhile, the NSP 1607 seeks the needed bandwidth for the program delivery service. Of course, audio program, software and game downloads may require less bandwidth than video. At steps 1661 and 1663, the NSP 1607 seeks to establish the necessary bandwidth at the FMP 1605 for receiving the needed resources. The FMP needs to assure a channel having the bandwidth required is available from the terminal or PC 1601 to the FMP 1605. The FMP 1605 then returns bandwidth and resource availability ok or not ok data to the NSP 1607.

If the movie is available on multicast and the bandwidth is available, then the NSP can issue a service grant message for the desired video service to the ISD 1603 at step 1665. The ISD 1603 then signals the receiving device which may be a television, a recorder/player, a personal computer, a video phone, home theater center or other terminal or collection of terminals 1601 that it is ready to provide the service at step 1667. The final play connection is shown at step 1669.

Referring now to FIG. 17, there is shown yet another example of service connectivity by an NSP 36 as already generally described by FIGS. 9A and 9B. In the application shown in FIG. 17, any user may enter and periodically update a user profile showing their interests and preferences. The NSP 1707 comprising significant cache memory can search for and obtain information directly related to the user entered preferences. When the user actuates their personal computer, the user may obtain the collected information that the NSP has collected on the user's behalf. The same convention as previously used with respect to FIGS. 9A and 9B is used here as well. Components of the system and service architecture are shown at the top including personal computer (PC) or network computer (NC) or other terminal 1701, intelligent services director (ISD) 1703, facilities management platform (EMP) 1705 and network server platform (NSP) 1707. Info #1 1709 and Info #2 1711 are shown by way of example as one ore more information service providers that the NSP 1707 may access for information. Finally, by way of example, AT&T information content servers as a group are shown as AT&T Content Servers 1713.

At step 1751, the personal computer, intelligent terminal, video phone or other terminal 1701 performs system/service initialization. Without a user profile, the service may not be able to retrieve any relevant information. There is a startup via a user interface applet, for example, by clicking on a user profile icon. Then, the user is presented with a user profile display or other input means for inputting information contents of interest to the user. The contents ultimately may refer to channels whereby the information can be obtained, for example, stock market ticker or sports ticker channels. Likewise, the contents may simply define a preference such as to information directed to genealogical research of an ancestor or hobby or scientific interests or pursuits.

In an alternative or additional mode of operation, a limited user profile may be "learned" by the ISD 1703 and forwarded to the NSP 1707 for storage from the habits and historical access data and interests monitored for the terminal 1701. For example, the NSP 1707 may learn and store as a user profile that the user frequently accesses a favorite department store and may utilize this information to collect advertised sale information from that department store's web site or other public information database.

At step 1753, the user profile for selected contents (information channels) is transmitted via the ISD 1703 and FMP 1705 for storage at the NSP 1707. The NSP 1707 then updates the user profile at step 1755 that is presently stored in memory or initializes the user profile in memory. The NSP 1707 then, once the use profile is known, can begin to search for relevant information at any and all information sources available on SONET ring network 42 (FIG. 1), any associated corporate LAN or any connected Internet. The NSP 1707 then forwards an auto-start Info Receiver applet to the PC/NC 1701 for display, for example, as a menu selectable item or an icon or the like. Whenever the user accesses that applet or at system or user defined intervals, the collected information for their user profile is pushed to their terminal at step 1771.

However, prior to an information to terminal dump at step 1771, the NSP collects information from various sources at steps 1761, 1763 and 1765. The access to the information source may be via private line, shared line, Internet or telephony channels. For example, at step 1761 the information contents of Info #1 1709 relevant to the user profile is downloaded and stored in cache memory of NSP 1707 for that user to identify themselves and access. At step 1763, the information contents of Info #2 1711 relevant to the user profile is downloaded and stored in cache memory of NSP 1707 for the same user. Only two information sources are shown but many information sources may be queried and the query results downloaded to NSP 1707. Finally, via AT&T or other Internet service provider, the respective information content servers may be queried for relevant information and or channels (virtual or physical) realized and provided to NSP 1707. These may include stock market tickers, sports tickers, new tickers and the like of current interest. At either NSP 1707 or personal computer or network computer 1701, information filters may be used to only retrieve current data with respect to, for example, the stock portfolio or sports teams of interest to the user. Moreover, the NSP 1707 must periodically update the cache memory with newly received information relevant to the user's requests. A new information source may appear on the Internet or as a telephone listing or a new sports or other channel may be identified to NSP 1707 for polling. This is shown as step 1767.

In summary, then as shown at step 1769, the NSP 1707 caches contents from different sources (including from itself, for example, local directory listings and geographical location finding services). The NSP also polls contents from various sources to, for example, obtain updates or new information. At a user specified time interval or according to a user specified schedule as per their user profile, and according to a user specified priority ranking, the information may be ordered and delivered to the user via an information push at step 1771.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

What is claimed is:

1. A telecommunications network method for accessing a plurality of alternative networks comprising the steps of receiving a request from a calling party for access to obtain one of directory services, billing services and information retrieval services via a particular network, authorizing said request for access to obtain said one service by searching a database to ensure that one of said calling party or a party called by said user is a subscriber to said one service, configuring a facilities controller at a telecommunications office for routing to said particular network of the plurality of networks, the facilities controller being coupled to a plurality of user service directors, said user service directors for accessing one of directory service, billing and payment and user selected data memories and permitting the user access to the network when one of said services is authorized to that user and the facilities controller obtains the requisite facilities.

2. The method of claim 1 wherein said plurality of networks includes an Internet network accessible by said calling party.

3. The method of claim 1 for billing services further comprising the step of downloading a secure viewing applet to a user device, the user device being intelligent, when secure network access is required and, responsive thereto, the user device actuating a billing data securing application.

4. The method of claim 3 wherein said user device comprises a display and said network connects a billing server to said user device, the display permitting viewing of billing information by said calling party.

5. The method of claim 1 wherein said configuration step comprises configuring said controller with a directory server address and further comprises the step of obtaining directory information without connection via a local exchange carrier.

6. The method of claim 5 for permitting a user to perform a directory lookup comprising the further steps of querying a database for a result based on identification data and desired output data including directions from a location associated with said calling party and a location associated with said identification data.

7. The method of claim 6 further comprising the step of outputting data indicative of a number of matches for said identification data and relative proximity of said matches to said calling part.

8. The method of claim 1 further comprising the step of receiving and storing a user profile in memory, said user profile reflecting user selected information interests of said user and a user predetermined time schedule, collecting information related to said interest, and pushing collected information to said user according to said time schedule.

9. The method of claim 8 wherein said user profile is obtained by observing the user's calling patterns and determining user selected information interests therefrom.

10. The method of claim 8 wherein said information comprises an information channel of sequenced information collected in response to said user profile.

11. The method of claim 8 wherein said user profile of user selected information interests comprises priority data for said interests.

12. The method of claim 8 further comprising the step of downloading an information receive applet responsive to a user profile update.

13. A network server platform of a telecommunications network for hosting a plurality of services, said network server platform comprising a memory for storing a user profile, said user profile containing user selected information interests of a user and a user defined priority of said interests, and for storing information related to said interests and a controller, responsive to a facilities controller at a telecommunications office of said telecommunications network, for controlling the collection of information from information servers, for outputting application applets to customer premise equipment, for pushing said information to said user in accordance with said user defined priority of said user selected information interests and, responsive to a software change, updating the application applets residing in the customer premise equipment.

14. A network server platform of a telecommunications network for hosting a plurality of services, said network server platform comprising a memory for storing a user profile, said user profile containing user selected information interests of a user and a user defined priority of said interests, and for storing information related to said interests, a controller, responsive to a facilities controller at a telecommunications office of said telecommunications network, for controlling the collection of information from information servers and for pushing said information to said user in accordance with said user defined priority of said user selected information interests, and a call processor for processing a plurality of functions including voice recognition for recognizing spoken commands and distributed operating system functions.

* * * * *